United States Patent [19]

Hoppe et al.

[11] Patent Number: 5,270,454
[45] Date of Patent: Dec. 14, 1993

[54] REACTIVE DYESTUFFS

[75] Inventors: Manfred Hoppe, Kürten; Karl-Josef Herd, Odenthal-Holtz; Frank-Michael Stöhr, Odenthal-Osenau; Hermann Henk, Cologne; Karl-Heinz Schündehütte, Leverkusen, all of Fed. Rep. of Germany

[73] Assignee: Bayer Aktiengesellschaft, Leverkusen, Fed. Rep. of Germany

[21] Appl. No.: 653,840

[22] Filed: Feb. 11, 1991

[30] Foreign Application Priority Data

Feb. 17, 1990 [DE] Fed. Rep. of Germany ....... 4005121
Feb. 25, 1990 [DE] Fed. Rep. of Germany ....... 4005929

[51] Int. Cl.$^5$ .................. C07D 403/12; C09B 62/02; D06D 3/66
[52] U.S. Cl. .................. 534/634; 534/632; 534/618; 544/187; 544/193.1; 544/211; 544/212; 544/75; 544/225; 544/181; 544/189; 8/466; 540/426
[58] Field of Search ............... 534/634, 779, 780, 792, 534/839, 842, 845, 885

[56] References Cited

FOREIGN PATENT DOCUMENTS 0132223 12/1986 European Pat. Off. .
1165661 10/1969 United Kingdom .

*Primary Examiner*—Robert T. Bond
*Attorney, Agent, or Firm*—Sprung Horn Kramer & Woods

[57] ABSTRACT

Reactive dyestuffs of the formula

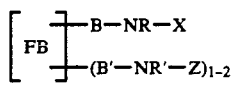

in which

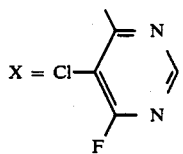

and Z=a heterocyclic reactive group and the remaining groups have the meaning indicated in the description, are outstandingly suitable for dyeing and printing materials containing hydroxyl groups or amide groups.

10 Claims, No Drawings

REACTIVE DYESTUFFS

The invention relates to reactive dyestuffs of the formula

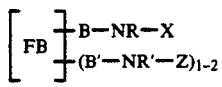  (1)

in particular dyestuffs of the formula

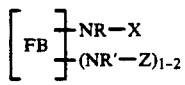  (1a)

in which

FB = the radical of a dyestuff or of the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, B or B' = a direct bond or bridge member to a ring C atom of an aromatic-carbocyclic ring in FB or to a ring C or N atom of an aromatic-heterocyclic ring in FB,

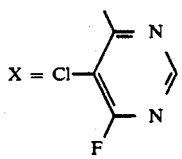

Z = a heterocyclic fibre-reactive radical

R and R' = H, optionally substituted $C_1-C_6$-alkyl (preferred substituents: halogen, OH, COOH, $SO_3H$, $OSO_3H$), with the exception of the dyestuff of the formula

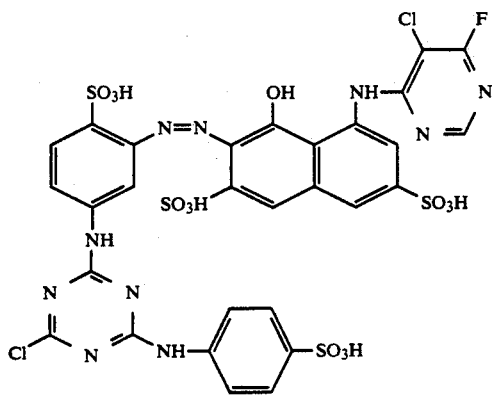

Examples of suitable bridge members B and B', which may be identical or different, are

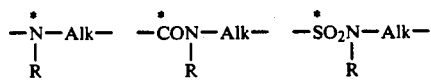

-continued

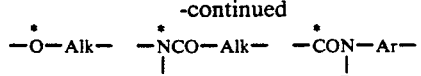

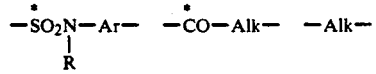

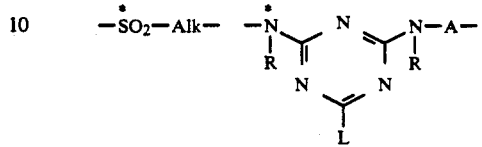

—Alk—Ar— where the star marks the position of linkage to FB,

R has the abovementioned meaning,

Alk denotes straight-chain or branched $C_1-C_6$-alkylene which is optionally interrupted by heteroatoms or groups containing heteroatoms such as N, O or S, Ar denotes optionally substituted phenylene or naphthylene or a radical of a diphenyl or stilbene, Q denotes Alk or Ar or —Alk—Ar— where Alk or Ar may contain other substituents, for example F, Cl, Br, $C_1-C_4$-alkyl, $C_1-C_4$-alkoxyl, carboxyl or sulpho, L denotes F, Cl, Br, optionally substituted amino, OH, $C_1-C_4$-alkoxy, optionally substituted phenoxy or $C_1-C_4$-alkylthio.

Suitable fibre-reactive radicals Z, i.e. those which react with the OH or NH groups of the fibre under dyeing conditions with the formation of covalent bonds, are in particular those which contain at least one reactive substituent on a 5- or 6-membered aromatic-heterocyclic ring, for example on a monoazine, diazine or triazine ring, in particular a pyridine, pyrimidine, pyridazine, pyrazine, thiazine, oxazine or asymmetrical or symmetrical triazine ring, or on a ring system of the type which has one or more fused aromatic-carbocyclic rings, for example a quinoline, phthalazine, cinnoline, quinazoline, quinoxaline, acridine, phenazine and phenanthridine ring system.

Among the reactive substituents on the heterocycle, examples which may be mentioned are halogen (Cl, Br or F), ammonium including hydrazinium, pyridinium, picolinium, carboxypyridinium, sulphonium, sulphonyl, azido ($N_3$), thiocyanato, mercaptoether, hydroxyether, sulphinic acid and sulphonic acid.

Examples which may be mentioned in particular are: 2,4-difluoro-6-triazinyl, 2,4-dichloro-6-triazinyl, monohalogeno-sym.-triazinyl radicals, in particular monochloro- and monofluorotriazinyl radicals, which are substituted by alkyl, aryl, amino, monoalkylamino, dialkylamino, aralkylamino, arylamino, morpholino, piperidino, pyrrolidino, piperazino, alkoxy, aryloxy, alkylthio or arylthio, where alkyl preferably denotes optionally substituted $C_1-C_4$-alkyl, aralkyl preferably denotes optionally substituted phenyl-$C_1-C_4$-alkyl and aryl preferably denotes optionally substituted phenyl or naphthyl and where preferred substituents for alkyl are halogen, hydroxyl, cyano, vinylsulphonyl, substituted alkylsulphonyl, dialkylamino, morpholino, $C_1-C_4$-alkoxy, vinylsulphonyl-$C_2-C_4$-alkoxy, substituted alkylsulphonyl-$C_2-C_4$-alkoxy, carboxyl, sulpho or sulphato and preferred substituents for phenyl and naphthyl are sulpho, $C_1$–$C_4$-alkyl, $C_1$–$C_4$-alkoxy, carboxyl, halogen, acylamino, vinylsulphonyl, substituted alkylsulphonyl, hydroxyl or amino.

The following radicals may be mentioned in particular: 2-amino-4-fluoro-6-triazinyl, 2-methylamino-4-fluoro-6-triazinyl, 2-ethylamino-4-fluoro-6-triazinyl, 2-isopropylamino-4-fluoro-6-triazinyl, 2-dimethylamino-4-fluoro-6-triazinyl, 2-diethylamino-4-fluoro-6-triazinyl, 2-β-methoxy-ethylamino-4-fluoro-6-triazinyl, 2-β-hydroxyethylamino-4-fluoro-6-triazinyl, 2-di-(β-hydroxyethylamino)-4-fluoro-6-triazinyl, 2-β-sulphoethylamino-4-fluoro-6-triazinyl, 2-β-sulphoethyl-methylamino-4-fluoro-6-triazinyl, 2-carboxymethylamino-4-fluoro-6-triazinyl, 2-di-(carboxymethylamino)-4-fluoro-6-triazinyl, 2-sulphomethyl-methylamino-4-fluoro-6-triazinyl, 2-β-cyanoethylamino-4-fluoro-6-triazinyl, 2-benzylamino-4-fluoro-6-triazinyl, 2-β-phenylethylamino-4-fluoro-6-triazinyl, 2-benzyl-methylamino-4-fluoro-6-triazinyl, 2-(4'-sulphobenzyl)-amino-4-fluoro-6-triazinyl, 2-cyclohexylamino-4-fluoro-6-triazinyl, 2-(o-, m-, p-methylphenyl)-amino-4-fluoro-6-triazinyl, 2-(o-, m-, p-sulphophenyl)-amino-4-fluoro-6-triazinyl, 2-(2',5'-disulphophenyl)-amino-4-fluoro-6-triazinyl, 2-(o-, m-, p-chlorophenyl)-amino-4-fluoro-6-triazinyl, 2-(o-, m-, p-methoxyphenyl)-amino-4-fluoro-6-triazinyl, 2-(2'-methyl-4'-sulphophenyl)-amino-4-fluoro-6-triazinyl, 2-(2'-methyl-5'-sulphophenyl)-amino-4-fluoro-6-triazinyl, 2-(2'-chloro-4'-sulphophenyl)-amino-4-fluoro-6-triazinyl, 2-(2'-chloro-5'-sulphophenyl)-amino-4-fluoro-6-triazinyl, 2-(2,-methoxy-4'-sulphophenyl)-amino-4-fluoro-6-triazinyl, 2-(o-, m-, p-carboxyphenyl)-amino-4-fluoro-6-triazinyl, 2-(2',4'-disulphophenyl)-amino-4-fluoro-6-triazinyl, 2-(3',5'-disulphophenyl)-amino-4-fluoro-6-triazinyl, 2-(2'-carboxy-4'-sulphophenyl)-amino-4-fluoro-6-triazinyl, 2-(2'-carboxy-5'-sulphophenyl)-amino-4-fluoro-6-triazinyl, 2-(6'-sulphonaphthyl-(2'))-amino-4-fluoro-6-triazinyl, 2-(4',8'-disulphonaphthyl-(2'))-amino-4-fluoro-6-triazinyl, 2-(6',8'-disulphonaphthyl-(2'))-amino-4-fluoro-6-triazinyl, 2-(N-methyl-N-phenyl)-amino-4-fluoro-6-triazinyl, 2-(N-ethyl-N-phenyl)-amino-4-fluoro-6-triazinyl, 2-(N-β-hydroxyethyl-N-phenyl) -amino-4-fluoro-6-triazinyl, 2-(N-iso-propyl-N-phenyl)-amino-4-fluoro-6-triazinyl, 2-morpholino-4-fluoro-6-triazinyl, 2-piperidino-4-fluoro-6-triazinyl, 2-(4',6',8'-trisulphonaphthyl-(2'))-amino-4-fluoro-6-triazinyl, 2-(3',6',8,-trisulphonaphthyl -(2'))-amino-4-fluoro-6-triazinyl, 2-(3',6'-disulphonaphthyl -(1'))-amino-4-fluoro-6-triazinyl, N-methyl-N-(2'4-dichloro-6-triazinyl)-carbamyl, N-methyl-N-(2-methylamino-4-chloro-6-triazinyl)-carbamyl, N-methyl-N-(2-dimethylamino-4-chloro-6-triazinyl)-carbamyl, N-methyl- or N-ethyl-N-(2,4-dichloro-6-triazinyl)-aminoacetyl, 2-methoxy-4-fluoro-6-triazinyl, 2-ethoxy-4-fluoro-6-triazinyl, 2-phenoxy-4-fluoro-6-triazinyl, 2-(o-, m- or p-sulphophenoxy)-4-fluoro-6-triazinyl, 2-(o-, m- or p-methyl- or -methoxy-phenoxy)-4-fluoro-6-triazinyl, 2-β-hydroxyethylmercapto-4-fluoro-6-triazinyl, 2-phenylmercapto-4-fluoro-6-triazinyl, 2-(4'-methylphenyl)mercapto-4-fluorotriazinyl, 2-(2',4'-dinitrophenyl)mercapto-4-fluoro-6-triazinyl, 2-methyl-4-fluoro-6-triazinyl, 2-phenyl-4-fluoro-6-triazinyl, and the corresponding 4-chloro- or 4-bromo-triazinyl radicals and the corresponding radicals obtainable by halogen exchange with tertiary bases such as trimethylamine, triethylamine, dimethyl-β-hydroxyethylamine, triethanolamine, N,N-dimethylhydrazine, pyridine, α-, β- or γ-picoline, nicotinic acid or isonicotinic acid, and sulphinates, in particular benzenesulphinic acid or hydrogensulphite.

The halogenotriazinyl radicals may also be linked to a second halogenotriazinyl radical or to a halogenodiazinyl radical or to one or more vinylsulphonyl or sulphatoethylsulphonyl radicals, for example via a bridge member

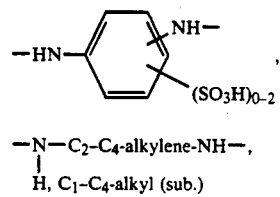

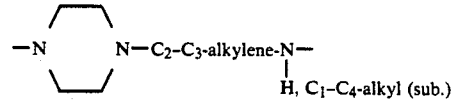

or in the case of the sulphatoethylsulphonyl or vinylsulphonyl group via a bridge member

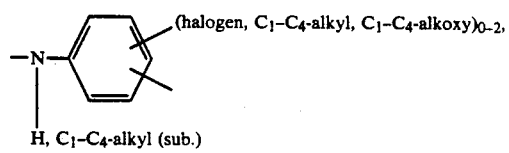

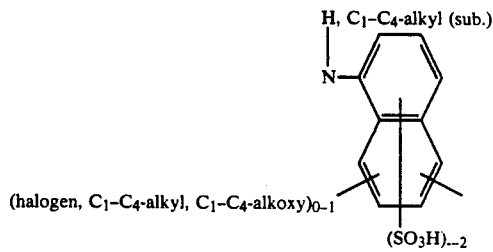

-continued
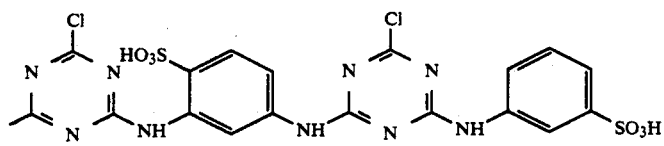
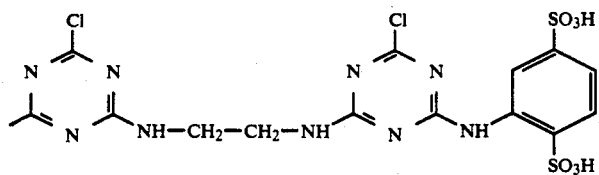
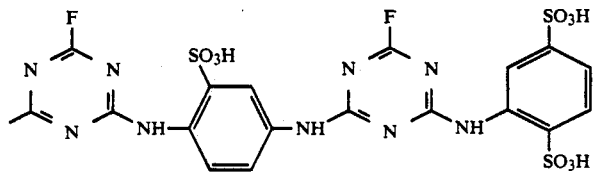
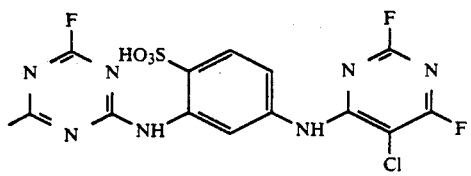
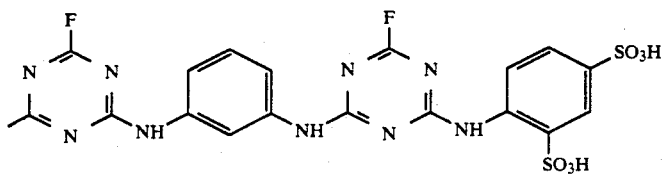
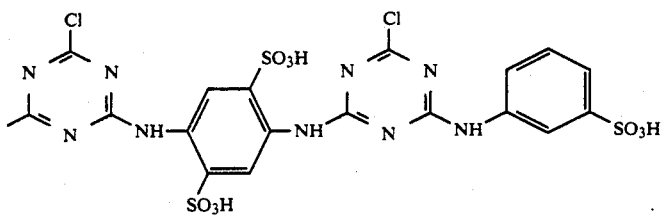
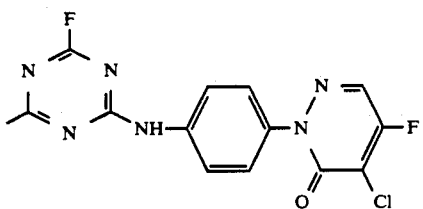
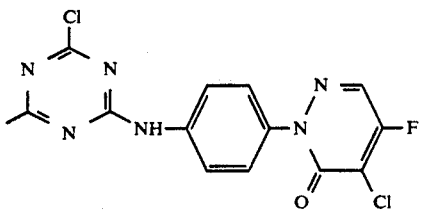

-continued
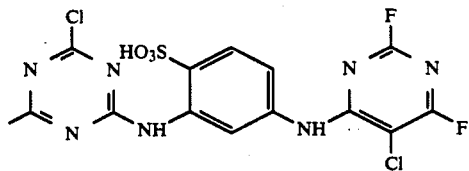
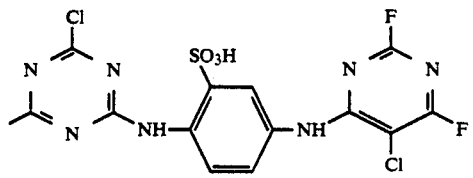
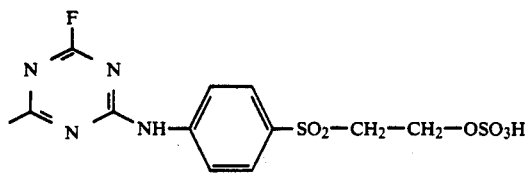
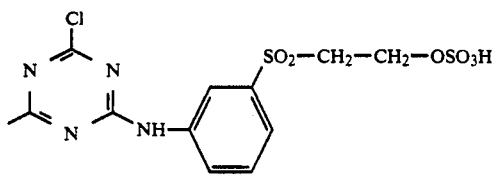
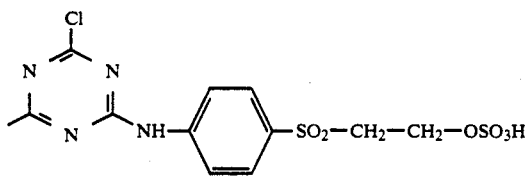
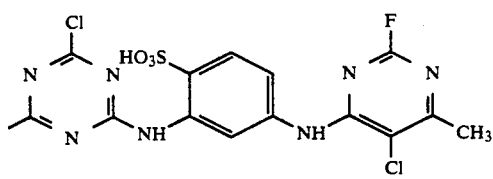
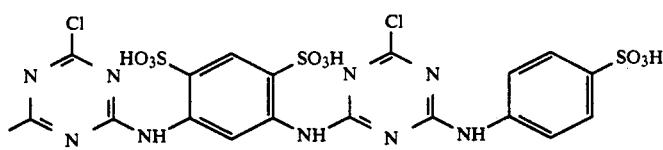
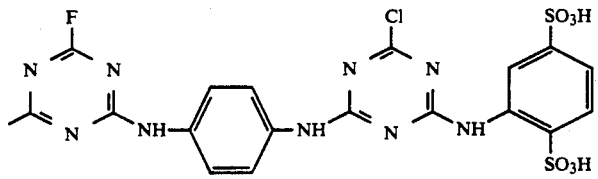
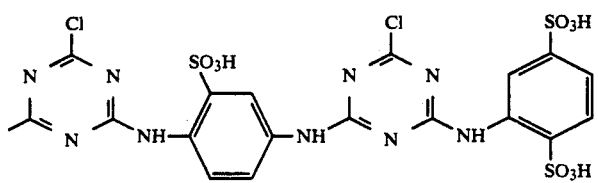
Mono-, di- or trihalogenopyrimidinyl radicals, such as 2,4-dichloro-6-pyrimidinyl, 2,4,5-trichloro-6-pyrimidinyl, 2,4-dichloro-5-nitro- or -5-methyl- or -5-carboxymethyl- or -5-carboxy- or -5-cyano- or -5-vinylor -5-sulpho- or -5-mono-, -di- or -trichloromethyl- or -5-carbalkoxy-6-pyrimidinyl, 2,6-dichloropyrimidinyl-4-carbonyl, 2,4-dichloropyrimidinyl-5-carbonyl, 2-chloro-4-methylpyrimidinyl-5-carbonyl, 2-methyl-4-chloropyrimidinyl-5-carbonyl, 2-methylthio-4-fluoropyrimidinyl-5-carbonyl, 6-methyl-2,4-dichloropyrimidinyl-5-carbonyl, 2,4,6-trichloropyrimidinyl-5-carbonyl, 2,4-dichloropyrimidinyl-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-dichloroquinoxaline-5- or -6-carbonyl, 2,3-dichloroquinoxaline-5- or -6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloro-1'-pyridazon-6'-yl)-phenylsulphonyl or -carbonyl, β-(4',5'-dichloro-1'-pyridazon-6'-yl)-ethylcarbonyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chloro-substituted heterocyclic radicals, among these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulphonyl-6-pyrimidinyl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; sulphonyl group-containing triazine radicals, such as 2,4-bis-(phenylsulphonyl)-6-triazinyl, 2-(3'-carboxyphenyl)-sulphonyl-4-chloro-6-triazinyl, 2-(3'-sulphophenyl)-sulphonyl-4-chloro-6-triazinyl, 2,4-bis-(3'-carboxyphenylsulphonyl)-6-triazinyl; sulphonyl group-containing pyrimidine rings, such as 2-carboxymethylsulphonyl-4-pyrimidinyl, 2-methylsulphonyl-6-methyl-4-pyrimidinyl, 2-methylsulphonyl-6-4-pyrimidinyl, 2,6-bis-methylsulphonyl-4-pyrimidinyl, 2,6-bis-methylsulphonyl-5-chloro-4-pyrimidinyl, 2,4-bismethylsulphonyl-pyrimidine-5-sulphonyl, 2-methylsulphonyl-4-pyrimidinyl, 2-phenylsulphonyl-4-pyrimidinyl, 2-trichloromethylsulphonyl-6-methyl-4-pyrimidinyl, 2-methylsulphonyl-5-chloro-6-methyl-4-pyrimidinyl, 2-methylsulphonyl-5-bromo-6-methyl-4-pyrimidinyl, 2-methylsulphonyl-5-chloro-6-ethyl-4-pyrimidinyl, 2-methylsulphonyl-5-chloro-6-chloromethyl-4-pyrimidinyl, 2-methylsulphonyl-4-chloro-6-methylpyrimidine-5-sulphonyl, 2-methylsulphonyl-5-nitro-6-methyl-4-pyrimidinyl, 2,5,6-tris-methylsulphonyl-4-pyrimidinyl, 2-methylsulphonyl-5,6-dimethyl-4-pyrimidinyl, 2-ethylsulphonyl-5-chloro-6-methyl-4-pyrimidinyl, 2-methylsulphonyl-6-chloro-4-pyrimidinyl, 2,6-bis-methylsulphonyl-5-chloro-4-pyrimidinyl, 2-methylsulphonyl-6-carboxy-4-pyrimidinyl, 2-methylsulphonyl-5-sulpho-4-pyrimidinyl, 2-methylsulphonyl-6-carbomethoxy-4-pyrimidinyl, 2-methylsulphonyl-5-carboxy-4-pyrimidinyl, 2-methylsulphonyl-5-cyano-6-methoxy-4-pyrimidinyl, 2-methylsulphonyl-5-chloro-4-pyrimidinyl, 2-β-sulphoethylsulphonyl-6-methyl-4-pyrimidinyl, 2-methylsulphonyl-5-bromo-4-pyrimidinyl, 2-phenylsulphonyl-5-chloro-4-pyrimidinyl, 2-carboxymethylsulphonyl-5-chloro-6-methyl-4-pyrimidinyl, 2-methylsulphonyl-6-chloropyrimidine-4- and -5-carbonyl, 2,6-bis(methylsulphonyl)-pyrimidine-4-, or -5-carbonyl, 2-ethylsulphonyl-6-chloropyrimidine-5-carbonyl, 2,4-bis(methylsulphonyl)-pyrimidine-5-sulphonyl, 2-methylsulphonyl-4-chloro-6-methylpyrimidine-5-sulphonyl or -carbonyl; 2-chlorobenzothiazole-5- or -6-carbonyl or -5- or -6-sulphonyl, 2-arylsulphonyl or alkylsulphonylbenzothiazole-5- or -6-carbonyl or -5- or -6-sulphonyl, such as 2-methylsulphonyl or 2-ethylsulphonylbenzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or sulphonyl derivatives containing sulpho groups in the fused benzene ring, 2-chlorobenzoxazole-5- or -6-carbonyl or -sulphonyl, 2-chlorobenzimidazole-5- or -6-carbonyl or -sulphonyl, 2-chlorobenzimidazole-5- or -6-carbonyl or sulphonyl, 2-chloro-1-methylbenzimidazole-5- or -6-carbonyl or -sulphonyl, 2-chloro-4-methyl-thiazole-(1,3)-5-carbonyl or -4- or -5-sulphonyl, N-oxide of 4-chloro- or 4-nitroquinoline-5-carbonyl.

Preferred reactive dyestuffs of the formula (1) are those in which FB is the radical of a mono- or disazo dyestuff or a metal complex azo dyestuff.

In this case, the radicals —B—N(R)—X and —B'—N(R')—Z are bonded to different or identical radicals of starting components, i.e. diazo and coupling components. Preferably, the radicals —B—N(R)—X and —B'—N(R')—Z are each bonded to one component, diazo component or coupling component. The reactive dyestuffs then have, for example, the formula

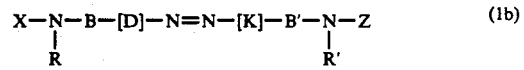

(1b)

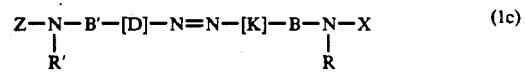

(1c)

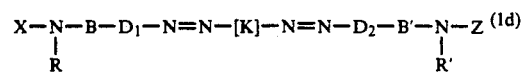

(1d)

-continued

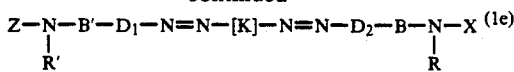

in which —K— in formulae (1d) and (1e) represents the radical of a doubly-coupling coupling component.

If both radicals —B—N(R)—X and —B'—N(R')—Z are bonded to the same radical of a starting component D or K, this is in particular the radical of the coupling component K. The reactive dyestuffs then correspond to the formula r

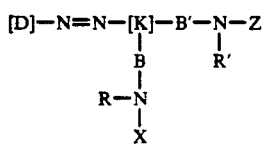

in which

D, $D_1$ and $D_2$ = a radical of a diazo component of the benzene or naphthalene series, K = a radical of a coupling component of the benzene, naphthalene, acetic acid arylide or heterocyclic series; preferably a pyrazolone or pyridone radical in the heterocyclic series.

The radicals D, $D_1$, $D_2$ and K can in this case be substituted by other azo groups or by azo group-containing radicals and in a similar manner to that mentioned above for the radical FB of the formula (1), where X, Z, B, $B_1$, R and R, have the abovementioned meanings.

Examples of D, $D_1$ and $D_2$ are preferably phenyl or phenylene, which is optionally substituted by SO$_3$H, chlorine, C$_1$-C$_4$-alkoxy, C$_1$-C$_4$-alkyl, carbalkoxy or sulphonamido, naphthyl or naphthylene, which is optionally substituted by SO$_3$H, chlorine, C$_1$-C$_4$-alkoxy or C$_1$-C$_4$-alkyl, 4-(phenylazo)phenyl which is optionally substituted by SO$_3$H and biphenylene which is optionally substituted by SO$_3$H.

K represents, for example, the radical of a coupling component from the hydroxybenzene, hydroxynaphthalene, aminobenzene, aminonaphthalene or aminohydroxynaphthalene series, a 5-hydroxy-3-methyl (or carboxyl)-pyrazolone, a 6-hydroxy-2-pyridone or an acetic acid arylide radical which is optionally ring-substituted by C$_1$-C$_4$-alkyl or C$_1$-C$_4$-alkoxy.

K can have the customary substituents, in particular sulphonic acid groups.

Additionally to be taken into account are reactive dyestuffs of the formula (1b) to (1f), in which the radicals D, $D_1$, $D_2$ and K can additionally contain another reactive radical. Thus, tri- and tetrareactive dyestuffs are also included but where, however, at least one reactive radical is the 6-fluoro-5-chloro-4-pyrimidinyl radical. The additional reactive radicals included in D or K can be bonded, like Z and X, via amino groups, or in other ways, for example by a direct bond to D or K. The above explanations also apply analogously to the metal complexes of the mono- and disazo dyestuffs (1b-1f).

Particularly preferred reactive dyestuffs of the formula (1) or (1a)-(1f) according to the invention are those in which Z is a radical of the formula

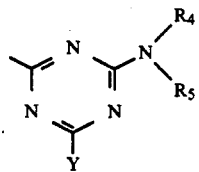

in which $R_4$ and $R_5$ independently of one another are hydrogen, C$_{1-4}$-alkyl which is optionally substituted by halogen, cyano, C$_{1-4}$-alkoxy, hydroxyl, carboxyl, sulpho or sulphato, benzyl, phenethyl, cyclohexyl, phenyl or —NHCH$_2$CH$_2$OCH$_2$CH$_2$—SO$_2$M (M=—CH=CH$_2$ or —CH$_2$CH$_2$—V where V=a radical which can be eliminated by alkali); phenyl which is optionally substituted by halogen, nitro, cyano, trifluoromethyl, sulphamoyl, carbamoyl, C$_{1-4}$-alkyl, C$_{1-4}$-alkoxy, C$_{1-4}$-alkanoylamino, benzoylamino, ureido, hydroxyl, carboxyl, sulphomethyl or sulpho, or naphthyl which is optionally substituted by halogen, nitro, C$_{1-4}$-alkoxy, C$_{1-4}$-alkanoylamino, hydroxyl, carboxyl or sulpho, or in which $R_4$ and $R_5$, together with the amino nitrogen atom, form a morpholino, piperidino or piperazino radical, and in which Y = Cl, F or an optionally substituted pyridinium radical.

Preferred dyestuffs here are those where Y = F. In the context of the dyestuffs where Y = Cl, those are preferred in which —NR$_4$R$_5$ has the abovementioned meaning but

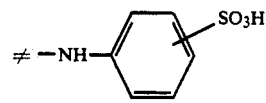

Furthermore particularly preferred dyestuffs according to the invention are those in which X and Z both represent the 5-chloro-6-fluoro-4-pyrimidinyl radical.

Furthermore preferred dyestuffs of the formula (1) are those in which

—(B'—N—Z) represents
　　　|
　　　R'

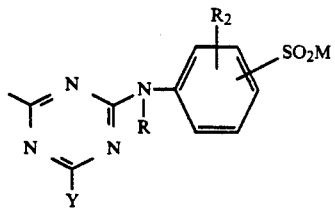

in which

Y = Cl, F or an optionally substituted pyridinium radical,

M = CH=CH$_2$ or CH$_2$CH$_2$—V, in which

V = a radical which can be eliminated by alkali, for example OSO$_3$H, SSO$_3$H, OCOCH$_3$, OPO$_3$H$_2$, OSO$_2$CH$_3$, SCN, NHSO$_2$CH$_3$, Cl, Br, F, OCOC$_6$H$_5$, OSO$_2$—C$_6$H$_4$, [N(CH$_3$)$_3$]$^+$ anion$^-$ or an optionally substituted pyridinium radical (substituents in particular optionally substituted C$_1$-C$_4$-alkyl, COOH, SO$_3$H, CN or carboxamide) and $R_2$ = H, Cl, Br, C$_1$-C$_4$-alkyl, C$_1$-C$_4$-alkoxy, CO$_2$H or SO$_3$H.

Preferred reactive dyestuffs are those of the formula

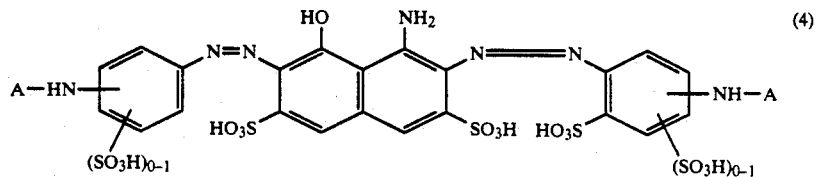

in which both radicals A are X or one A is X and the other A is Z, and X and Z have the meanings indicated under formula (1), $R_3$ is hydrogen, methyl or ethyl, and the benzene ring E is optionally additionally substituted.

Preferred reactive dyestuffs are also those of the formula

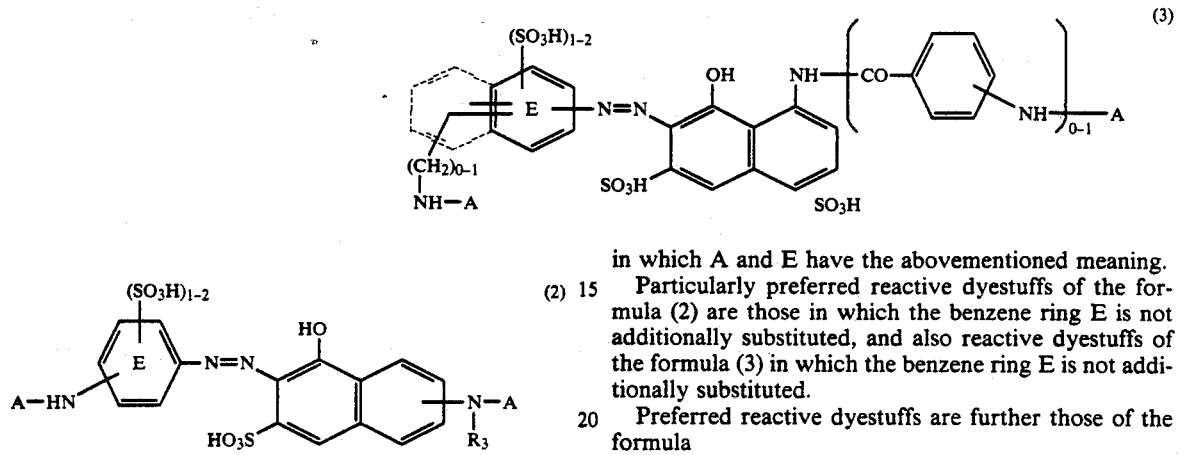

in which A and E have the abovementioned meaning.

Particularly preferred reactive dyestuffs of the formula (2) are those in which the benzene ring E is not additionally substituted, and also reactive dyestuffs of the formula (3) in which the benzene ring E is not additionally substituted.

Preferred reactive dyestuffs are further those of the formula

in which A has the abovementioned meaning.

In addition to the reactive dyestuffs of the formulae (2), (3) and (4) described further above, further useful representatives which may be mentioned are the reactive dyestuffs of the formulae which follows:

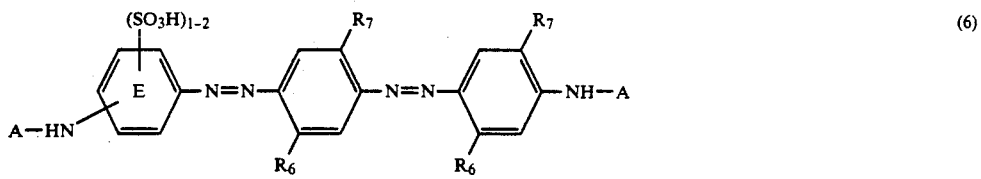

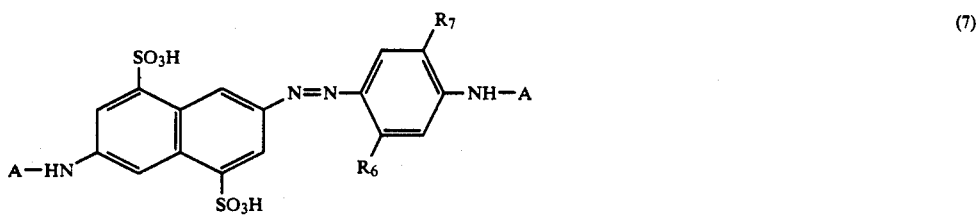

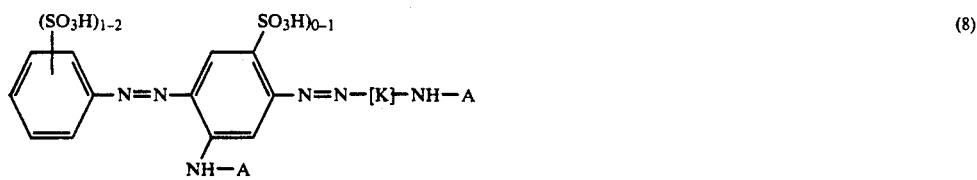

-continued
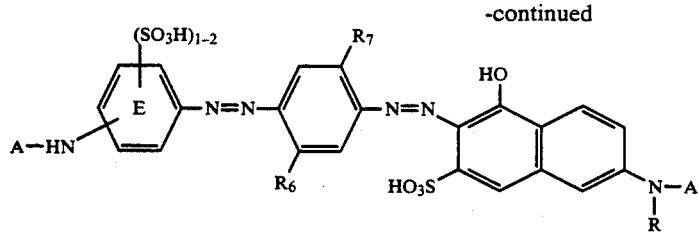
(9)
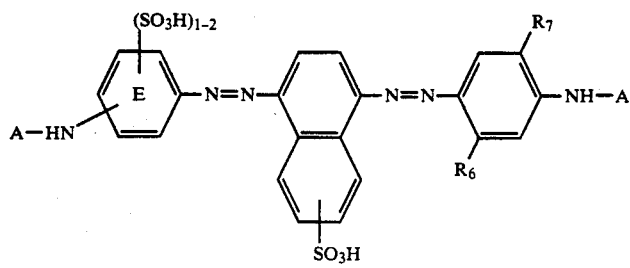
(10)
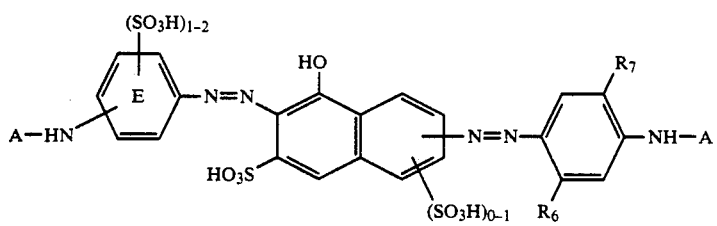
(11)
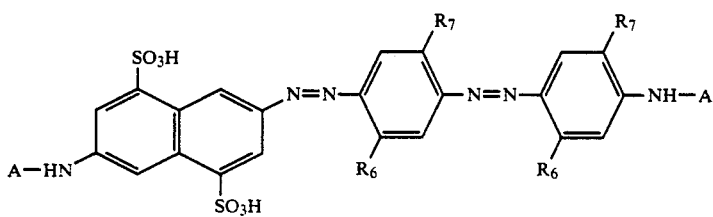
(12)
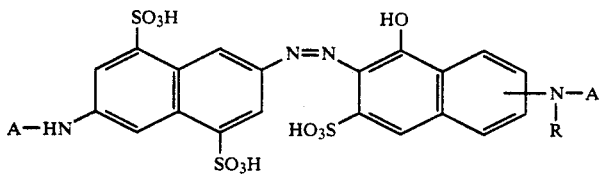
(13)
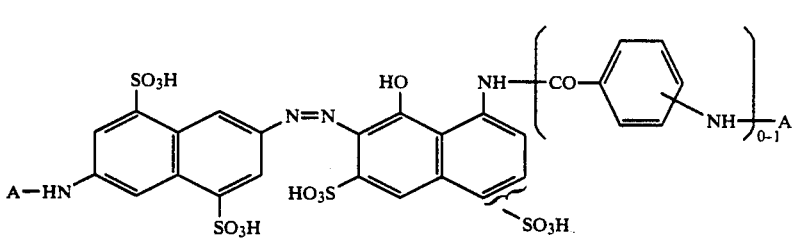
(14)
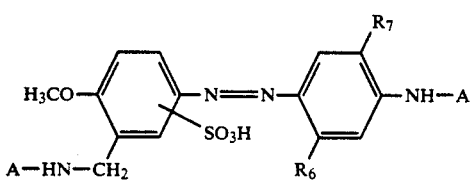
(15)
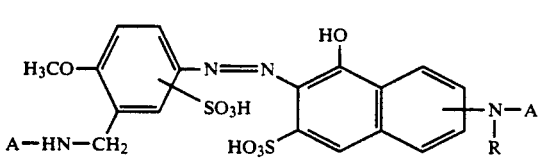
(16)

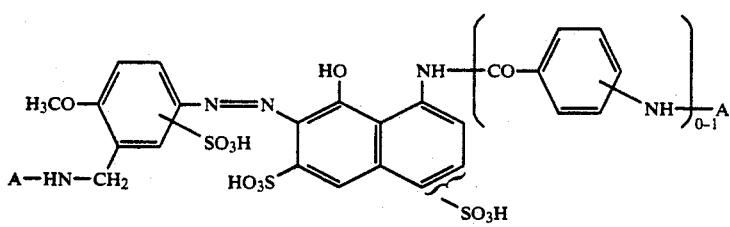
(17)
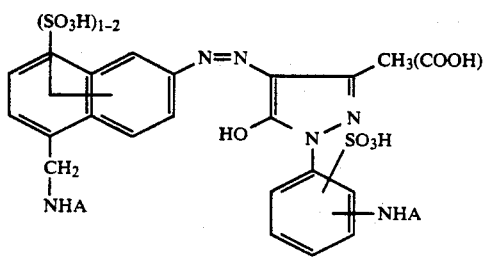
(18)
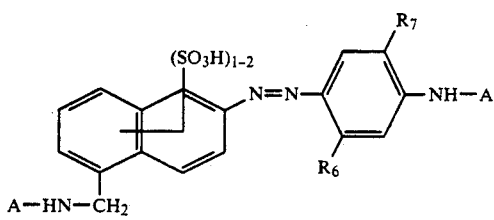
(19)
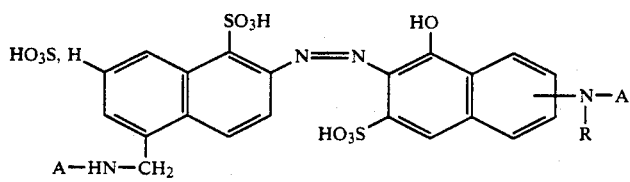
(20)
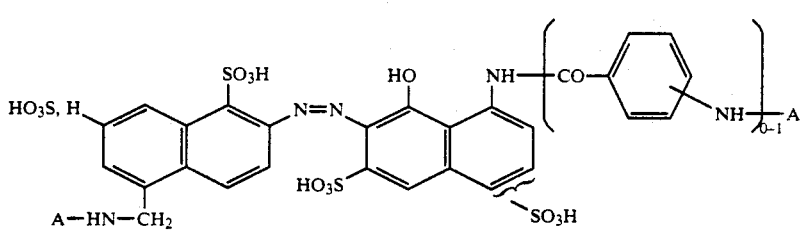
(21)
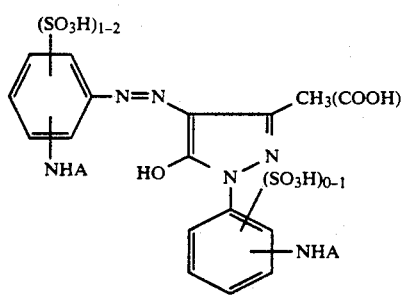
(22)
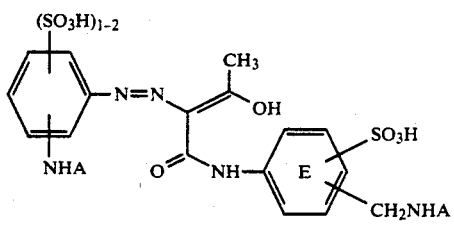
(23)

-continued
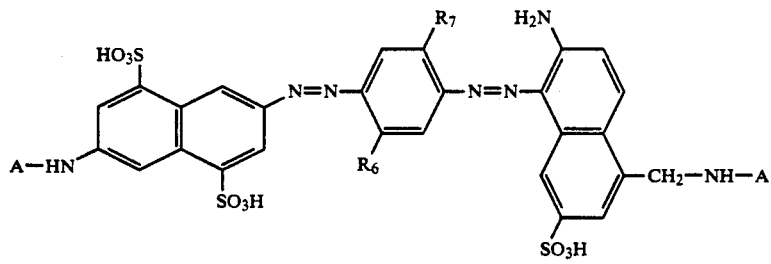
(24)
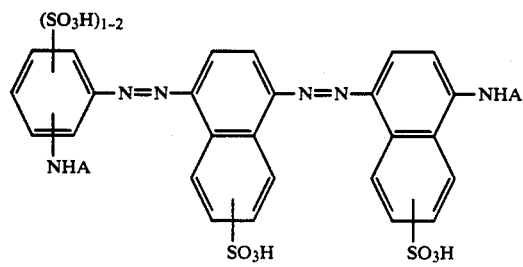
(25)
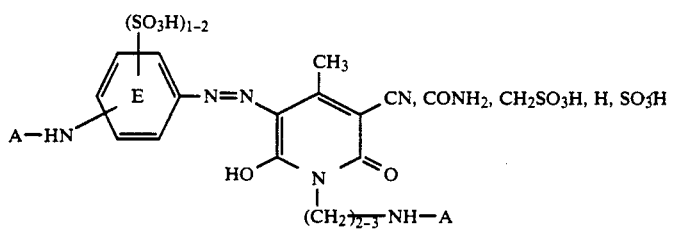
(26)
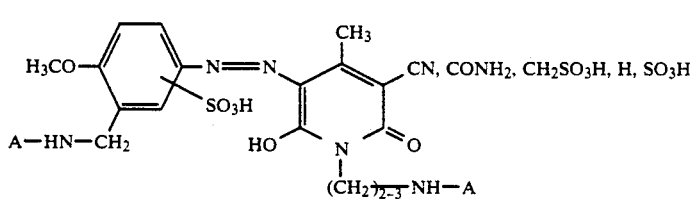
(27)
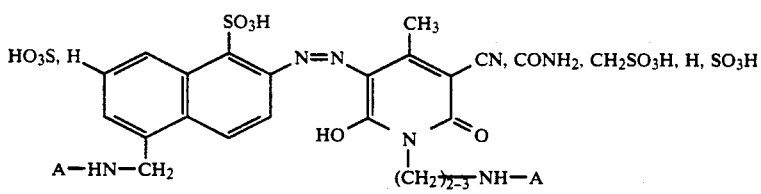
(28)
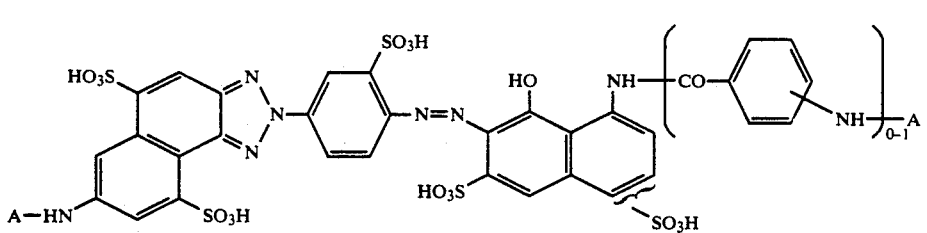
(29)
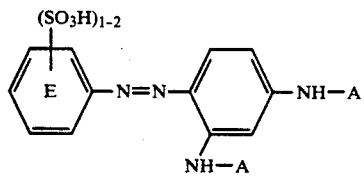
(30)

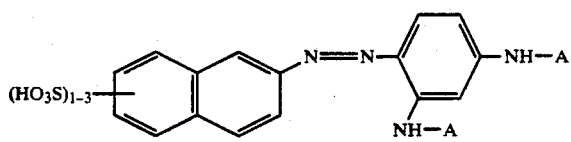 (31)
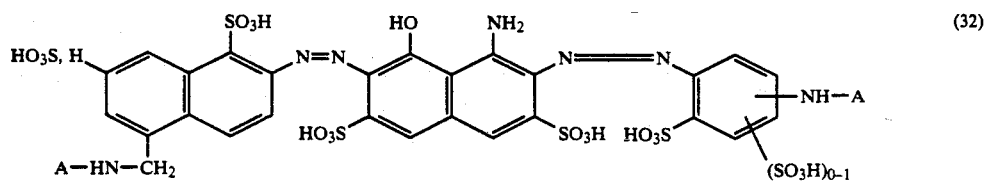 (32)
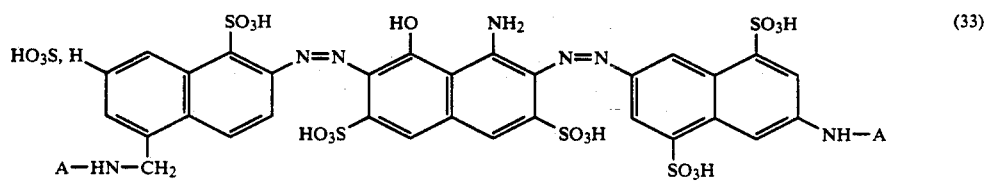 (33)
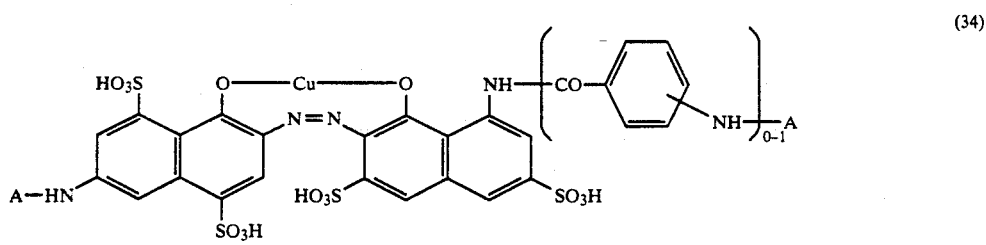 (34)
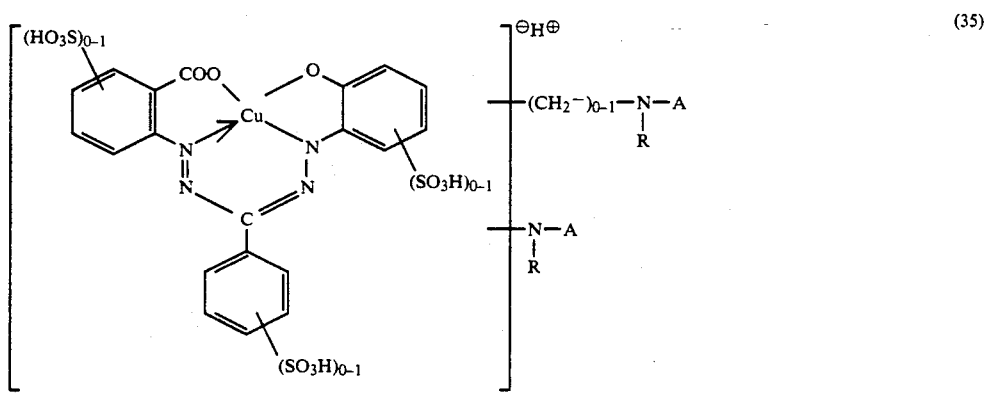 (35)
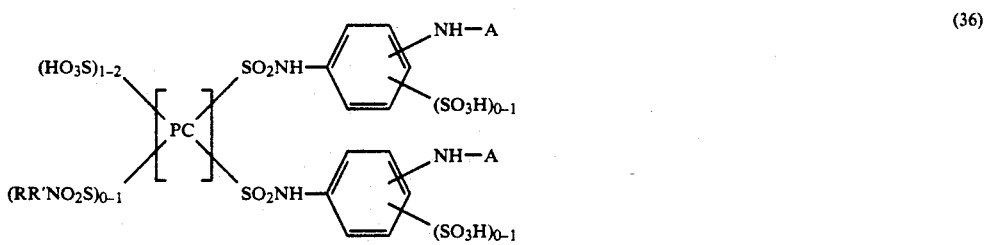 (36)
in which Pc represents a Cu or Ni phthalocyanine radical and the total number of the substituents on the Pc structure is at most 4; and R and R' have the abovementioned meaning,

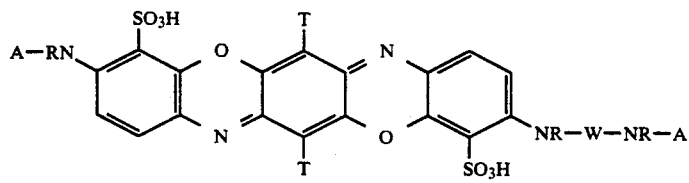

(37)

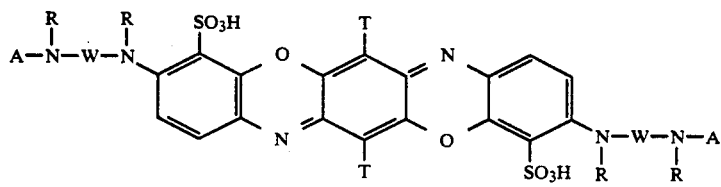

(38)

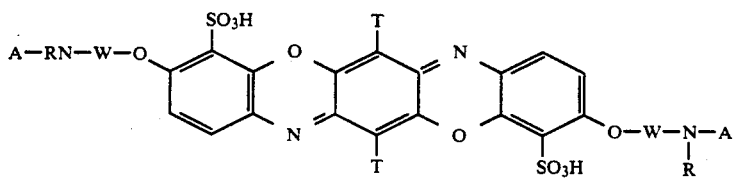

(39)

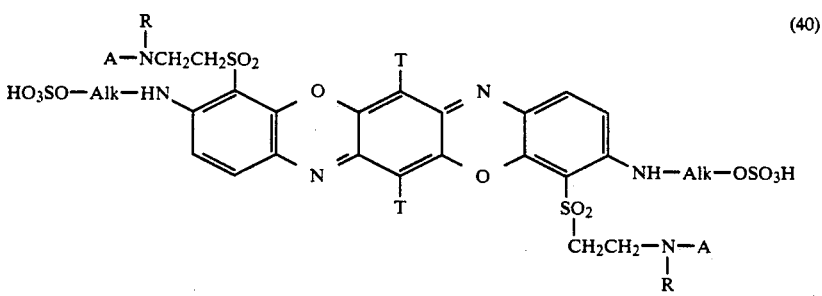

(40)

where T=Cl, Br, OCH$_3$ and A, E, R and Alk have the abovementioned meanings,

R$_6$=H, C$_1$–C$_4$-alkyl, C$_1$–C$_4$-alkoxy, acylamino, in particular C$_1$–C$_4$-alkylcarbonylamino, C$_1$–C$_4$-alkylsulphonylamino, aminocarbonylamino, optionally substituted phenylcarbonylamino, Cl or Br R$_7$=H, C$_1$–C$_4$-alkyl, C$_1$–C$_4$-alkoxy, OH or SO$_3$H.

W=an aliphatic bridge member, in particular C$_2$–C$_4$-alkylene.

In the preferred reactive dyestuffs of the formulae (2) and (3), the benzene rings E are preferably not also additionally substituted; diazo components used in this case are above all 1,3-phenylene-4-sulphonic acid, 1,4-phenylenediamine-2-sulphonic acid, 1,4-phenylenediamine-2,5-disulphonic acid or 1,3-phenylenediamine-4,6-disulphonic acid. The radical R$_3$ in formula (2) is in particular hydrogen, methyl or ethyl.

Preferred reactive dyestuffs are above all those of the formulae (2) to (40) in which A is an unsubstituted or substituted aminofluoro-s-triazine radical, in which —NR$_4$R$_5$ preferably represents: —NH$_2$, morpholino, N-β-hydroxyethylamino, N,N-di-β-hydroxyethylamino, β-sulphoethylamino, phenylamino which is optionally substituted in the phenyl ring by chlorine, methyl, ethyl, methoxy, ethoxy, acetylamino, hydroxyl, carboxyl, sulphomethyl or sulpho, N-C$_{1-4}$-alkyl-N-phenylamino which is optionally substituted in the phenyl ring by chlorine, methyl or ethyl, N-sulpho-C$_{1-4}$-alkyl-N-phenylamino which is optionally substituted in the phenyl ring by chlorine, methyl or ethyl, N-hydroxy-C$_{1-4}$-alkyl-N-phenylamino or sulphonaphthylamino, and the second reactive radical A represents the 6-fluoro-5-chloro-4-pyrimidyl radical, such as, for example, dyestuffs of the formula (41)

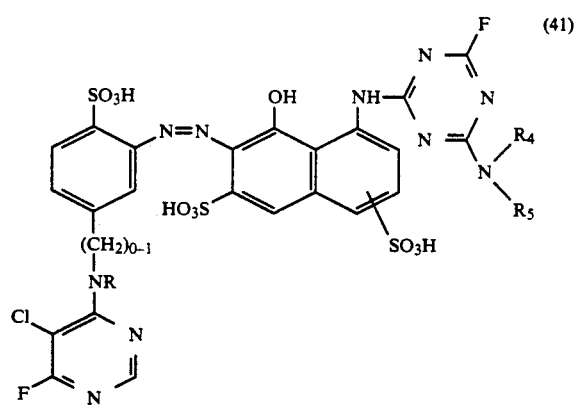

(41)

Preferred dyestuffs are (2) to (40) in which both radicals A represent X, and those in which one radical A represents X and the other represents

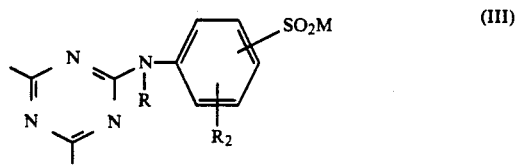

(III)

A process for the preparation of the dyestuffs (1) consists in reacting dyestuffs

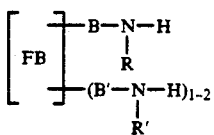 (IV)

or the corresponding dyestuff precursors with 1 to 2 mol of a reactive component

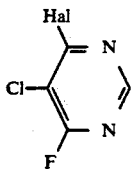 (V)

and, if appropriate, 1 to 2 mol of a reactive component $$Z\text{—Hal} \quad (VI)$$

in which Hal=Cl, Br or F, and in the case of the use of precursors then converting these into the desired final dyestuffs and, if appropriate, adding other transformation reactions.

In the preparation of the preferred azo dyestuffs, the diazo components and the coupling components must together contain two amino groups -N(R)H and —N(R')H, and, if appropriate, other acylatable amino groups. If desired, appropriate acetylamino or nitro compounds are used in which the acetylamino or nitro group is converted into the NH$_2$ group by hydrolysis or reduction before condensation with a halogenotriazine, halogenopyrimidine or the like. The reactive radicals X and Z are introduced by condensation of dyestuffs or dyestuff precursors which contain acylatable amino groups, with fibre-reactive halogenated acylating agents. Couplings which lead to azo dyestuffs are usually used in the preparation of the final dyestuffs from precursors.

Since the individual process steps indicated above can be carried out in a variable sequence, different process variants are possible. In general, the reaction is carried out stepwise in succession, the sequence of the single reactions between the individual reaction components advantageously depending on the particular conditions. Since under certain conditions hydrolysis of a halogenotriazine or halogenopyrimidine radical etc. occurs, an intermediate which contains acetylamino groups must be hydrolyzed to remove the acetyl groups before it is condensed with an aminodifluorotriazine or trifluorotriazine etc. A possible further transformation reaction is, for example, the subsequent reaction of a dihalogenotriazinyl radical with an amine. Whichever reaction is expediently carried out first in the preparation of a secondary condensation product from amine HNR$_4$R$_5$, 2,4,6-trihalogeno-s-triazine and diaminobenzenesulphonic acid, that of the trihalogenotriazine with the amine or with the diaminobenzenesulphonic acid, differs from case to case and depends above all on the solubility of the amino compounds involved and the basicity of the amino groups to be acylated. The most important process variants are represented in the exemplary embodiments.

Examples of suitable starting compounds for the preparation of mono- or polyazo dyestuffs (1) are:

Diazo components (D, D$_1$ and D$_2$)

1,3-diaminobenzene, 1,4-diaminobenzene, 1,3-diamino-4-chlorobenzene, 1,3-diamino-4-methylbenzene, 1,3-diamino -4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene,4,4'-diaminostilbene,4,4'-diaminodiphenylmethane, 4,4'-diaminobiphenyl (benzidine), 3,3'-dimethylbenzidine, 3,3'-dimethylbenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulphonic acid, 1,4-diaminobenzene-2-sulphonic acid, 1,4-diaminobenzene-2,5-disulphonic acid, 1,4-diaminobenzene-2,6-disulphonic acid, 1,3-diaminobenzene-4-sulphonic acid, 1,3-diaminobenzene-4,6-disulphonic acid, 1,4-diamino-2-chlorobenzene-5-sulphonic acid, 1,4-diamino-2-methylbenzene-5-sulphonic acid, 1,5-diamino-6-methylbenzene-3-sulphonic acid, 1,3-diamino-6-methylbenzene-4-sulphonic acid, 3-(3,- or 4,-aminobenzoylamino)-1-aminobenzene-6-sulphonic acid, 1-(4'-aminobenzoylamino) -4-aminobenzene-2,5-disulphonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid,1,4-diaminobenzene-2-methylbenzene, 4,4'-diaminodiphenyl oxide, 4,4'-diaminodiphenylurea-2,2'-disulphonic acid, 4,4'-diaminodiphenyloxyethane-2,2'-disulphonic acid, 4,4'-diaminostilbene-2,2'-disulphonic acid, 4,4'-diaminodiphenylethane-2,2'-disulphonic acid, 2-amino-5-aminomethylnaphthalene-1-sulphonic acid, 2-amino-5-aminomethylnaphthalene-1,7-disulphonic acid, 1-amino-4-methoxy-5-aminomethylbenzene-6-sulphonic acid.

If, instead of a diamine, it is intended to employ an aminoacetylamino compound, from which the acetyl group is subsequently removed again by hydrolysis, as the diazo component, as is described above in the explanations of the process variants, the monoacetyl compounds of the abovementioned diazo components are suitable, for example 1-acetylamino-3-aminobenzene-4-sulphonic acid or 1-acetylamino-4-aminobenzene-3-sulphonic acid.

If the two radicals —B—N(R)—X and —B'—N(R')—Z in formula (1) are bonded to the same component, for example the coupling component, as is described further above, diazo components which can be used are also those which, apart from the amino group to be diazotized, contain no acylatable amino group, such as, for example, aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulphonamide, 1-aminobenzene-2-, -3- or -4-sulphonic acid, 1-aminobenzene-2,4- and -2,5-disulphonic acid, 1-amino-4-methylbenzene-2-sulphonic acid, 1-amino-3-methylbenzene-6-sulphonic acid, 1-amino-6-methylbenzene-3- or -4-sulphonic acid, 1-aminonaphthalene, 2-aminonaphthalene, 1-aminonaphthalene-2-, -4-, -5-, -6-, -7- or -8-sulphonic acid, 2-aminonaphthalene-1-, -3-, -4-, -5-, -6-, -7- or -8-sulphonic acid, 1-aminonaphthalene-3,6- or -5,7-disulphonic acid, 2-aminonaphthalene-1,5-, -1,7-, -3,6-, -5,7-, -4,8- or -6,8-disulphonic acid, 1-aminonaphthalene-2,5,7-trisulphonic acid, 2-aminonaphthalene-1,5,7-, -3,6,8- or -4,6,8-trisulphonic acid, 4-aminobenzene-3,4'-disulphonic acid, 3-methoxy-4-amino-6-methyl-azobenzene -2',4'-disulphonic acid or 3-methoxy-4-amino-6-methylazobenzene-2',5'-disulphonic acid.

Coupling Components (K)

1-Amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulphonic acid, 1-aminonaphthalene-6- or -8-sulphonic acid, 1-amino-2-methoxynaphthalene-6-sulphonic acid, 2-aminonaphthalene -5,7-disulphonic acid, 1-amino-8-hydroxynaphthalene-6-sulphonic acid, 1-amino-8-hydroxynaphthalene-2,4-disulphonic acid, 2-hydroxy-3-aminonaphthalene-5,7-disulphonic acid, 1-amino-8-hydroxynaphthalene-2,4,6-trisulphonic acid, 1-hydroxy-8-acetylaminonaphthalene-3-sulphonic acid, 1-benzoylamino-8-hydroxynaphthalene-3,6- or -4,6 -disulphonic acid, 2-benzoylamino-5-hydroxynaphthalene-7-sulphonic acid, 2-amino-5-hydroxynaphthalene-7-sulphonic acid, 2-methyl- or 2-ethylamino-5-hydroxynaphthalene-7-sulphonic acid, 2-(N-acetyl-N-methylamino)-5-hydroxynaphthalene-7-sulphonic acid, 2-acetylamino-5-hydroxynaphthalene-7-sulphonic acid, 2-amino-5-hydroxynaphthalene-1,7-disulphonic acid, 2-amino-8-hydroxynaphthalene-6-sulphonic acid, 2-methyl- or 2-ethylamino -8-hydroxynaphthalene-6-sulphonic acid, 2-(N-acetyl-N -methylamino)-8-hydroxynaphthalene-6-sulphonic acid, 2-acetylamino-8-hydroxynaphthalene-6-sulphonic acid, 2-amino-8-hydroxynaphthalene-3,6-disulphonic acid 2-acetylamino-8-hydroxynaphthalene-3,6-disulphonic acid, 1-amino-5-hydroxynaphthalene-7-sulphonic acid, 1-amino-8-hydroxynaphthalene-3,6- or -4,6-disulphonic acid, 1-acetylamino-8-hydroxynaphthalene-3,6-or-4,6-disulphonic acid, 1-(4,-aminobenzoylamino)-8-hydroxynaphthalene-3,6- or -4,6-disulphonic acid, 1-(4,-nitrobenzoylamino)-8-hydroxynaphthalene-3,6- or -4,6-disulphonic acid, 1-(3'-aminobenzoylamino)-8-hydroxynaphthalene-3,6- or -4,6-disulphonic acid, 1-(3'-nitrobenzoylamino)-8-hydroxynaphthalene-3,6- or -4,6-disulphonic acid, 2-(4'-amino-3'-sulphophenylamino) -5-hydroxynaphthalene-7-sulphonic acid, 1-amino-8-hydroxynaphthalene-4-sulphonic acid, 2,4,6-triamino-3-cyanopyridine, 1-$\beta$-aminoethyl-3-cyano -4-methyl-6-hydroxy-2-pyridone, 1-$\gamma$-aminopropyl-3-sulphomethyl -4-methyl-6-hydroxy-2-pyridone, 1,3-diaminobenzene.

The diazo components or the intermediates containing a diazotizable amino group are as a rule diazotized by the action of nitrous acid in aqueous mineral acid solution at low temperature. Coupling to the coupling component is carried out at strongly acidic or neutral to weakly alkaline pH values.

The reactive components are preferably condensed with the diazo components and the coupling components and with the amines or with acylatable monoazo or disazo intermediates or with the amino group-containing dyestuffs in aqueous solution or suspension, at low temperature and at weakly acidic or neutral to weakly alkaline pH. Advantageously, hydrogen halide liberated during the condensation is continuously neutralized by addition of aqueous alkali metal hydroxides, carbonates or bicarbonates.

The formulae given are those of the free acids. In the preparation, the salts are in general obtained, in particular the alkali metal salts such as sodium, potassium or lithium salts. The charge formed as a result of quaternization with pyridines is compensated, depending on the isolation conditions, by a counter-ion, for example chloride, fluoride or sulphate; or the dyestuffs form internal salts with sulpho or carboxyl groups.

All dyestuffs, in particular those which are reacted with pyridines in the last step, can be present, depending on the reaction conditions, as mixtures of the $\beta$-sulphatoethylsulphonyl dyestuffs and their eliminated form, the vinylsulphone. The dyestuffs can also be employed as concentrated solutions.

The dyestuffs according to the invention are outstandingly suitable for dyeing and printing natural and synthetic OH or amide group-containing materials, in particular those composed of cellulose and polyamides. They are particularly suitable for dyeing cellulose materials in the exhaust and cold pad batch process, and also for printing cotton and staple viscose.

Combined with good build-up properties and high fixing yields, dyeings having good general fastnesses, in particular wet fastnesses, are obtained.

EXAMPLE 1 a) 0.2 mol of 1-amino-8-hydroxynaphthalene-3,6-disulphonic acid are dissolved in 350 ml of water at pH 6.5 and cooled to 0° C. using 350 g of ice. 0.21 mol of 2,4,6-trifluoro-1,3,5-triazine (cyanuric fluoride) are added and the pH is kept between 3.5 and 4 using $Na_2CO_3$ solution. After 5 minutes, 0.2 mol of morpholine is added and the pH is adjusted to 7 using sodium carbonate solution. In the course of this, the temperature rises to about 10° C.

b) 0.2 mol of 6-fluoro-5-chloro-4-(3'-amino-4'-sulphophenyl)pyrimidine (prepared from 2,4-diaminobenzenesulphonic acid and 4,6-difluoro-5-chloropyrimidine) is suspended in water and 65 ml of 30% strength hydrochloric acid and 300 g of ice are added. 46 ml of 30% strength sodium nitrite solution are then added and the mixture is stirred at 0° C. for 1 hour. Excess sodium nitrite is destroyed using sulphamic acid and the diazotization mixture thus obtained is added to the solution of the coupling component a). A pH of 6–7 is set using sodium carbonate solution.

After coupling is complete, the dyestuff is salted out, isolated, dried and ground. The dyestuff thus obtained, of the formula

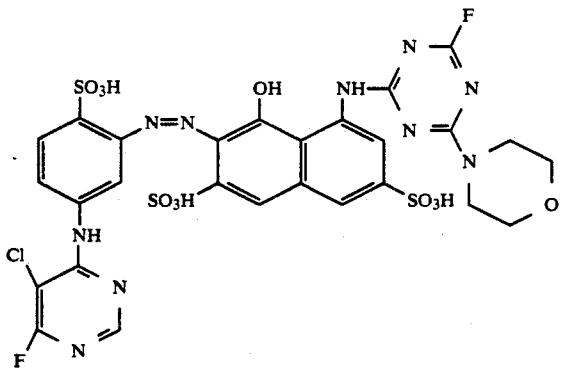

λ$_{max}$ = 515,532 nm (H$_2$O)

dyes cotton in clear red shades.

EXAMPLE 2 a) 0.2 mol of 1,4-diaminobenzene-2,5-disulphonic acid are dissolved in 500 ml of water using conc. sodium hydroxide solution to give a neutral solution. The solution is heated to 50° C and 0.3 mol of 4,6-difluoro-5-chloropyrimidine is added. A pH of 7 is maintained by simultaneous addition of sodium carbonate solution (20 g/100 ml). The reaction is complete after 3 hours. The mixture is cooled to 0° C. and 55 ml of 30% strength HCl are added. 47 ml of sodium nitrite solution (30 g/100 ml) are added dropwise at 0° C.-5° C. in the course of 30 minutes. The diazotization mixture is subsequently stirred at 0°-5° C. for 30 minutes. Excess nitrite is then destroyed using sulphamic acid.

b) 0.2 mol of 6-amino-1-naphthol-3-sulphonic acid are dissolved in 600 ml of water at pH 7-7.5 with the addition of 38 ml of 11% strength lithium hydroxide solution. 0.21 mol of cyanuric fluoride is added dropwise in the course of 30 minutes. A pH of 3.7-4.1 is maintained during the course of this by simultaneous dropwise addition of 11% strength lithium hydroxide solution. The mixture is subsequently stirred for 5 minutes and 0.2 mol of morpholine is added. A pH of 7 is set using sodium carbonate solution (20 g/100 ml). T=5°-8° C. The mixture is subsequently stirred for 15 minutes and the above diazotization mixture a) is added dropwise in the course of 1 hour. A pH of 5.5-6.5 is maintained using 1 molar sodium hydrogencarbonate solution. After coupling is complete, the product is salted out using NaCl, isolated and dried. The dyestuff of the formula

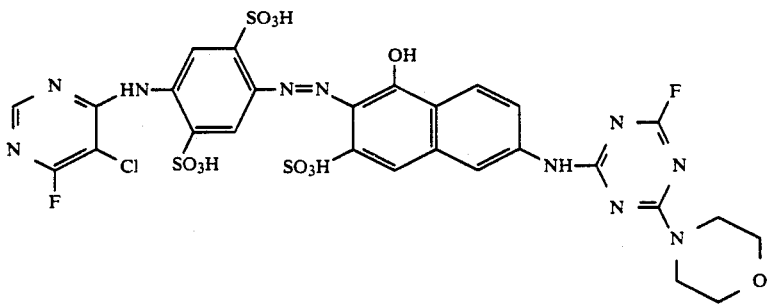

dyes cotton in red shades.

The dyestuffs of the following Examples 3-31 of the general formula

X+D+N=N+K+Z can be prepared in an analogous manner using the diazo or coupling components and amines mentioned. They dye cotton in the colour shades mentioned.

X has the meaning indicated in formula (1).

| | Diazo component | Coupling component | Z | Colour shade |
|---|---|---|---|---|
| 4 | 2-amino-4-(NH—X)-benzenesulfonic acid (SO₃H, NH₂, NH—X) | 8-amino-1-hydroxy-3-methyl-4,6-disulfo naphthalene with NH—Z | fluoro-methyl-morpholino triazine | Red |
| 5 | 3-amino-4-sulfo-benzyl-N(CH₃)—X | " | " | Red |
| 6 | 2-amino-5-(CH₂—NH—X)-1-sulfo naphthalene | " | fluoro-methyl-(3-sulfophenylamino) triazine | Red |
| 7 | 3-amino-5-(X—HN)-benzenesulfonic acid | 8-amino-1-hydroxy-3-methyl-4,6-disulfo naphthalene with NH—Z | fluoro-methyl-(3-sulfophenylamino) triazine | Bluish-tinged red |

| | Diazo component | Coupling component | Z | Colour shade |
|---|---|---|---|---|
| 8 | 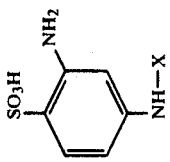 | 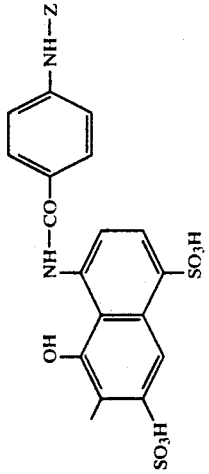 | | Red |
| 9 | 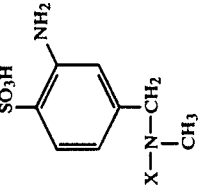 | | | Yellowish-tinged red |
| 10 | 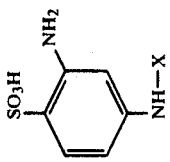 | 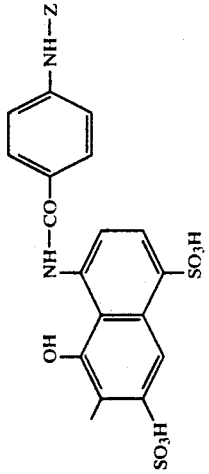 | 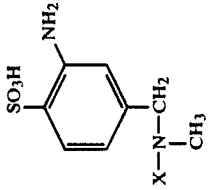 | Bluish-tinged red |
| 11 | 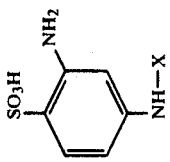 | | 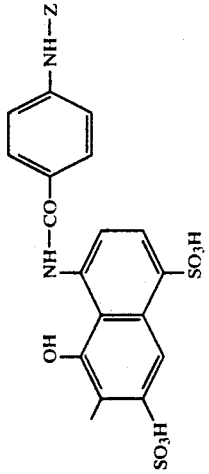 | Red |

-continued

| No. | Diazo component | Coupling component | Z | Colour shade |
|---|---|---|---|---|
| 12 | 2-amino-1-naphthalenesulfonic acid with X—HN—CH₂ at 5-position | 1-amino-8-hydroxy-naphthalene with NH—Z at 1-position, OH at 8, SO₃H at 5, and 3-methyl-7-sulfo (HO₃S) | triazine with F, CH₃, and N(CH₃)—CH₂CH₂SO₃H substituents | Red |
| 13 | 2-amino-1-sulfo-4-(X—HN)-benzene | " | triazine with F, CH₃, and piperidino substituent | Reddish-violet |
| 14 | 2-amino-1-sulfo-4-(X—NH)-benzene | " | triazine with F, CH₃, and N(CH₃)—CH₂—CH₂—CN | Red |
| 15 | " | 1-amino-8-hydroxy-naphthalene (NH—Z, OH, SO₃H, 3-methyl, 6-SO₃H) | triazine with F, CH₃, and N(phenyl)—CH₂CH₂OH | Red λmax = 515 nm. Sh 532 nm |

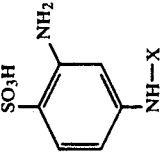

| | Diazo component | Coupling component | Z | Colour shade |
|---|---|---|---|---|
| 20 | X—NHCH$_2$CH$_2$SO$_2$— (4-aminophenyl) | " | fluoro-methyl-triazine with N(Et)phenyl | Red |
| 21 | X—NHCH$_2$CH$_2$SO$_2$— (2-amino-1-sulfo-5-naphthyl) | " | fluoro-methyl-triazine with N(Et)phenyl | Red |
| 22 | 2-amino-1-sulfo-4-(X—NH)-benzene | 1-amino-8-hydroxy-naphthalene-3,6-disulfonic acid with NH—Z and methyl | fluoro-triazine with NHCH$_2$CH$_2$OCH$_2$CH$_2$SO$_2$CH=CH$_2$ and methyl | Red $\lambda_{max} = 514$, 532 nm |
| 23 | 2-amino-1-sulfo-5-(X—NH)-benzene | " | fluoro-methyl-triazine with morpholino | Reddish-violet |

-continued

| | Diazo component | Coupling component | Z | Colour shade |
|---|---|---|---|---|
| 24 | 2-amino-4-(X-N(CH₃)-CH₂-)-benzenesulfonic acid structure | " | " | Red |
| 25 | 2-amino-4-(X-NH-)-benzenesulfonic acid structure | 8-hydroxy-4-(4-NH-Z-phenyl-NH-CO-)naphthalene-2,6-disulfonic acid with methyl | 2-fluoro-4-morpholino-1,3,5-triazin-6-yl (with methyl) | Red |
| 26 | 2-amino-4-(X-N(CH₃)-CH₂-)-benzenesulfonic acid structure | " | 2-fluoro-4-(N-methyl-N-phenylamino)-1,3,5-triazin-6-yl | Red λ$_{max}$ = 512 nm, 535 nm |
| 27 | 2-amino-3-sulfo-5-(X-NH-)-aniline structure | 4-hydroxy-3-methyl-6-NH-Z-naphthalene-2-sulfonic acid | 2-fluoro-4-diethylamino-1,3,5-triazin-6-yl | Scarlet |

| | Diazo component | Coupling component | Z | Colour shade |
|---|---|---|---|---|
| 28 | SO₃H, NH₂, X—N—CH₂ / CH₃ phenyl | OH, SO₃H, CH₃, NH—Z naphthalene | fluoro-triazinyl-morpholine | Orange |
| 29 | SO₃H, NH₂, NH—X phenyl | " | fluoro-triazinyl-N(Et)(Ph) | Orange |
| 30 | SO₃H, NH₂, NH—X phenyl | OH, SO₃H, CH₃, NH—Z, SO₃H naphthalene | " | Scarlet |
| 31 | SO₃H, NH₂, NH—X phenyl | OH, SO₃H, CH₃, NH—Z naphthalene | fluoro-triazinyl-NH-(3-sulfophenyl) | Orange |

EXAMPLE 32

0.2 mol of 1-amino-8-hydroxynaphthalene-3,6-disulphonic acid are dissolved in 450 ml of water at pH 8-9 using sodium hydroxide solution and 0.22 mol of 4,6-difluoro-5-chloropyrimidine is added. The condensation is carried out at 35°-40° C., the pH being maintained with sodium carbonate solution.

If coupling is carried out under the same conditions with the diazotization mixture described in Example 1, after salting out, isolating and drying, the dyestuff of the formula is obtained, which dyes cotton in red shades.

EXAMPLE 33

0.2 mol of 8-(4'-amino-benzoylamino)-1-naphthol-3,6-disulphonic acid are dissolved in 800 ml of water at a pH of 7 using sodium carbonate solution (20 g/100 ml). A pH of 4.5 is set using 10% strength HCl solution. 2.2 mol of 4,6-difluoro-5-chloropyrimidine are added and the mixture is heated to 30° C. A pH of 4.5-6 is maintained using sodium carbonate solution (20 g/100 ml). The reaction is complete after 4 hours.

0.2 mol of the diazonium salt from Example 1 is then added and a pH of 7.5-8 is simultaneously maintained by dropwise addition of sodium carbonate solution (20 g/100 ml). After coupling is complete, the product is salted out with NaCl, isolated and dried. The dyestuff of the formula

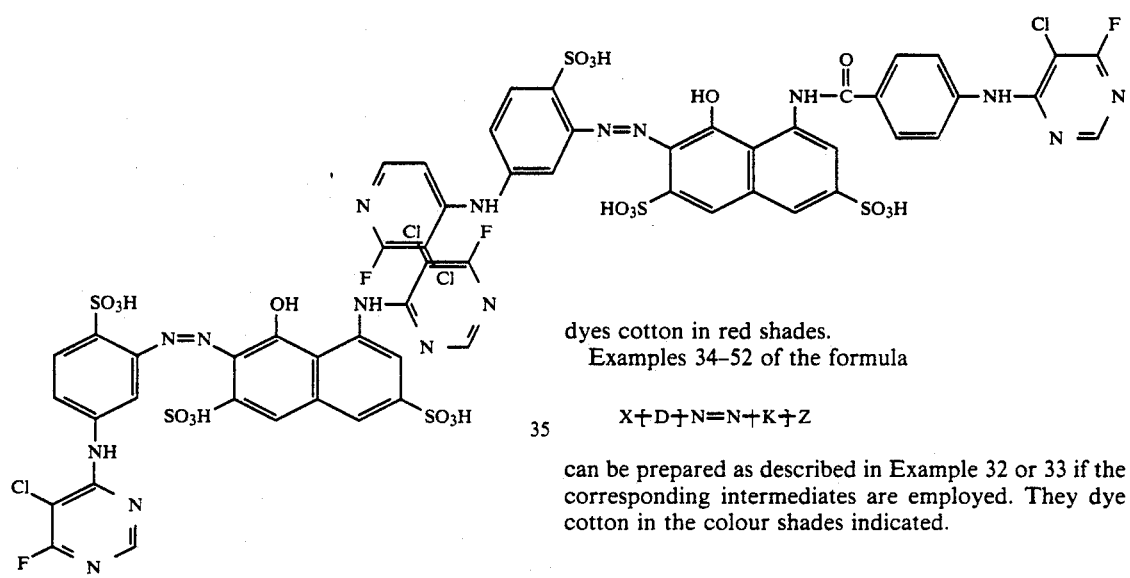

dyes cotton in red shades.

Examples 34-52 of the formula

can be prepared as described in Example 32 or 33 if the corresponding intermediates are employed. They dye cotton in the colour shades indicated.

| | Diazo component | Coupling component | Z | Colour shade |
|---|---|---|---|---|
| 35 | ![SO3H, NH2, X—NH benzene] | ![OH, NH—Z naphthalene disulfonic] | ![pyrimidine Cl, F] | Reddish-violet |
| 36 | ![SO3H, NH2, X—N(CH3)—CH2 benzene] | " | " | Red |
| 37 | ![SO3H, NH2, X—HN—CH2 naphthalene] | " | " | Blueish-tinged red |

-continued

| | Diazo component | Coupling component | Z | Colour shade |
|---|---|---|---|---|
| 38 | (benzene ring with SO₃H, NH₂, and X—N(CH₃)—CH₂ substituents) | (naphthalene with OH, NH—Z, CH₃, SO₃H, SO₃H) | (pyrimidine with Cl, F) | Red |
| 39 | (naphthalene with SO₃H, NH₂, and X—HN—CH₂) | " | " | Red |
| 40 | (benzene with SO₃H, NH₂, SO₃H, X—HN) | " | " | Blueish-tinged red |
| 41 | (benzene with SO₃H, NH₂, X—NH) | (naphthalene with OH, NH—Z, CH₃, SO₃H, SO₃H) | (pyrimidine with Cl, F) | Red |
| 42 | (benzene with SO₃H, NH₂, X—NH) | (naphthalene with OH, CH₃, SO₃H, NH—Z) | " | Scarlet |
| 43 | (benzene with SO₃H, NH₂, X—N(CH₃)—CH₂) | " | " | Orange |
| 44 | (benzene with SO₃H, NH₂, SO₃H, X—HN) | (naphthalene with OH, CH₃, SO₃H, NH—Z) | (pyrimidine with Cl, F) | Red |
| 45 | (benzene with SO₃H, NH₂, X—NH) | (naphthalene with OH, CH₃, SO₃H, NH—Z) | " | Orange |

-continued

| | Diazo component | Coupling component | Z | Colour shade |
|---|---|---|---|---|
| 46 | 2-amino-4-(X—NH)-benzenesulfonic acid (SO₃H, NH₂, X—NH on benzene) | 1-hydroxy-2-methyl-6-(N(CH₃)—Z)-naphthalene-3-sulfonic acid | 5-fluoro-6-chloro-pyrimidin-4-yl (F, Cl, F pyrimidine) | Orange |
| 47 | 2-amino-5-(X—NH)-benzenesulfonic acid | 8-hydroxy-5-[(4-(NH—Z)benzoyl)amino]-7-methyl-naphthalene-... -3,?-disulfonic acid (OH, NH—CO—C₆H₄—NH—Z, SO₃H, SO₃H) | chloro-fluoro-pyrimidinyl | Blueish-tinged red |
| 48 | 2-amino-4-(X—N(CH₃)CH₂)-benzenesulfonic acid | " | " | Red |
| 49 | 2-amino-5-(X—HN—CH₂)-naphthalene-1-sulfonic acid | " | fluoro-chloro-fluoro-pyrimidinyl (F, Cl, F) | Red |
| 50 | 2-amino-5-(X—HN)-benzene-1,4-disulfonic acid | 8-hydroxy-5-[(4-(NH—Z)benzoyl)amino]-7-methyl-naphthalene-disulfonic acid | chloro-fluoro-pyrimidinyl | Blueish-tinged |
| 51 | 2-amino-4-(X—NH)-benzenesulfonic acid | 8-hydroxy-5-[(4-(NH—Z)benzoyl)amino]-7-methyl-naphthalene-disulfonic acid | " | Red |
| 52 | 4-amino-(X—NH—CH₂CH₂SO₂)-phenyl | 8-hydroxy-5-(NH—Z)-7-methyl-naphthalene-3,6-disulfonic acid | " | Red |

EXAMPLE 53

0.2 mol of 1-amino-8-hydroxynaphthalene-3,6-disulphonic acid are dissolved at pH 6.5 in 650 ml of water and using sodium hydroxide solution and the mixture is warmed to 35° C. 0.21 mol of 2,3-dichloroquinoxaline-6-carbonyl chloride is added to this solution and the pH is adjusted to 6–7 using sodium carbonate solution and condensation is carried out at 35° C. for about 6 h.

The product is then coupled with 6-fluoro-5-chloro-4-(3'-amino-4'-sulphophenylamino)-pyrimidine diazotization mixture analogously to Example 1.

The dyestuff is salted out, isolated, dried and ground. It has the following formula

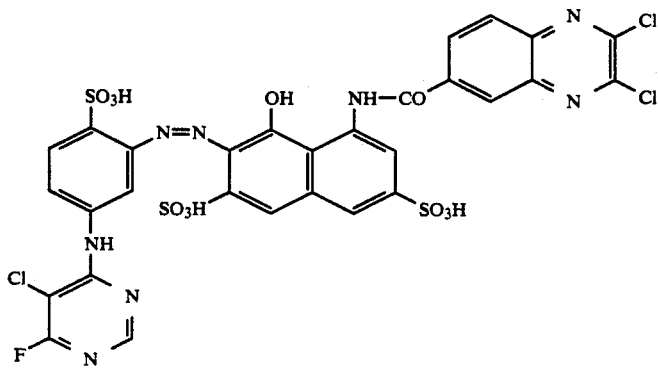

and dyes cotton in red shades.

As described above, the dyestuffs of Examples 54-64 of the formula

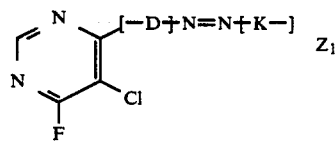

can be prepared using the diazo and coupling components (K) mentioned, in this case X has the meaning indicated in formula (1) and

| | Diazo component | K | Colour shade |
|---|---|---|---|
| | | $Z = -CO-\langle\text{quinoid}\rangle-N=C(Cl)-C(Cl)=N-$ | |
| 54 | 4-(X—NH)-2-SO$_3$H-aniline | OH, NH—Z$_1$ naphthalene with HO$_3$S and SO$_3$H | Blueish-tinged red |
| 55 | 3-amino-4-SO$_3$H-phenyl-N(CH$_3$)-X | " | Red |
| 56 | 4-(X—HN)-2,5-di-SO$_3$H-aniline | " | Blueish-tinged red |
| 57 | 2-amino-4-(X—NH)-benzenesulfonic acid | " | Red |

-continued

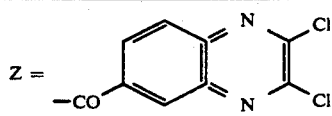

| | Diazo component | K | Colour shade |
|---|---|---|---|
| 58 | [structure with SO₃H, NH₂, X—N(CH₃)—CH₂] | [naphthol structure with OH, NH—Z₁, SO₃H, SO₃H] | Red |
| 59 | [naphthalene with SO₃H, NH₂, X—NH—CH₂] | [naphthol structure with OH, NH—Z₁, SO₃H, SO₃H] | Blueish-tinged red |
| 60 | [structure with SO₃H, NH₂, X—NH] | [naphthol with OH, NH—Z₁, HO₃S, SO₃H] | Reddish-violet |
| 61 | [structure with SO₃H, NH₂, X—NH] | [naphthol with OH, SO₃H, NH—Z₁] | Scarlet |
| 62 | [structure with SO₃H, NH₂, X—N(CH₃)—CH₂] | " | Orange |
| 63 | [structure with SO₃H, NH₂, X—NH] | | Orange |
| 64 | [structure with SO₃H, NH₂, X—NH] | [naphthol with OH, SO₃H, N(CH₃)—Z₁] | Orange |

EXAMPLE 65

0.26 mol of 3-(2-sulphatoethyl)sulphonyl-aniline are dissolved in 250 ml of water using 1 molar sodium hydrogencarbonate solution to give a neutral solution. 250 g of ice are added and 0.27 mol of cyanuric fluoride is added dropwise. A pH of 4–5 is maintained using 1 molar sodium hydrogencarbonate solution.

The mixture is subsequently stirred; for 10 minutes.

0.2 mol of 8-(4'-amino-benzoylamino)-1-naphthol-3,6-disulphonic acid are stirred in 300 ml of water and dissolved using 11% strength lithium hydroxide solution to give a neutral solution. This solution is added to the above condensation solution. A pH of 6.5-7 is maintained using sodium carbonate solution, and the temperature rises to about 10° C. After the reaction is complete, 0.2 mol of the diazonium salt from Example 1 is added and a pH of 7.5-8 is simultaneously maintained by dropwise addition of sodium carbonate solution (20 g/100 ml). After 3 hours, the product is salted out using NaCl, isolated and dried. The dyestuff obtained, of the formula

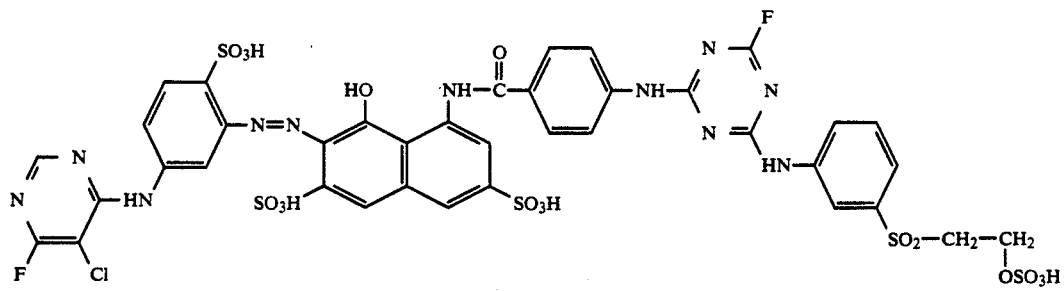

dyes cotton in red shades.

The dyestuffs of Examples 66-75 are obtained analogously using the corresponding diazo components coupling components and amines. They have the general formula

| | Diazo component | Coupling component | Z | Colour shade |
|---|---|---|---|---|
| 66 | SO₃H, NH₂, X—NH benzene | OH, SO₃H, NH—Z naphthalene | triazine with F, NH-phenyl-SO₂CH₂CH₂OSO₃H | Scarlet |
| 67 | SO₃H, NH₂, X—N(CH₃)—CH₂ benzene | " | " | Orange |
| 68 | SO₃H, NH₂, X—NH benzene | NH—Z, OH, SO₃H, SO₃H naphthalene | triazine with F, NH-phenyl-SO₂—CH=CH₂ | Red $\lambda_{max}$ = 515 nm, SH 535 nm |
| 69 | SO₃H, NH₂, X—NH benzene | NH—Z, OH, SO₃H, SO₃H naphthalene | triazine with F, NH-phenyl-SO₂CH₂CH₂OSO₃H | Red $\lambda_{max}$ = 514 nm |

X―(D)―N=N―(K)―Z

-continued

X—[D]—N=N—[K]—Z

| | Diazo component | Coupling component | Z | Colour shade |
|---|---|---|---|---|
| 70 | 2-amino-4-(N-methyl-X-amino-methyl)benzenesulfonic acid (SO₃H, NH₂, X—N(CH₃)—CH₂— on benzene) | 8-amino-1-hydroxy-3,6-naphthalenedisulfonic acid with NH—Z at 8-position (NH—Z, OH, SO₃H, HO₃S, with CH₃) | " | Red |
| 71 | same as 70 | same as 70 | triazine (F, N, N, CH₃) linked via NH to phenyl-SO₂—CH=CH₂ → CH₂—O—SO₃H | Red |
| 72 | 2-amino-5-(X-aminomethyl)-1-naphthalenesulfonic acid (NH₂, SO₃H, X—NH—CH₂—) | " | triazine (F, N, N, CH₃) linked via NH to m-phenyl-SO₂CH₂CH₂OSO₃H | Red |
| 73 | 2-amino-5-(X-aminomethyl)-1-naphthalenesulfonic acid (NH₂, SO₃H, X—NH—CH₂—) | " | triazine (F, N, N, CH₃) linked via NH to p-phenyl-SO₂CH₂CH₂OSO₃H | Blueish-tinged red |

-continued

X—[D]—N=N—[K]—Z

| | Diazo component | Coupling component | Z | Colour shade |
|---|---|---|---|---|
| 74 | 2-SO₃H, 3-NH₂, 5-(X—NH)— benzene | 8-(NH—CO—C₆H₄—NH—Z)-1-OH-2-methyl-naphthalene-3,6-disulfonic acid | '' | Red |
| 75 | 2-SO₃H, 3-NH₂, 5-[X—N(CH₃)—CH₂]— benzene | 8-(NH—CO—C₆H₄—NH—Z)-1-OH-2-methyl-naphthalene-3,6-disulfonic acid | 3-(SO₂CH₂CH₂OSO₃H)-phenyl-NH-(fluoro-isopropyl-triazinyl) | Red |

Note: Z in entry 75 is a triazine bearing F, isopropyl and NH-[3-(SO₂CH₂CH₂OSO₃H)phenyl] substituents.

EXAMPLE 76 a) 0.2 mol of 2-amino-4-(aminomethyl)-benzenesulphonic acid is dissolved in 500 ml of water at a pH of 8 using conc. sodium hydroxide solution. 0.25 mol of 4,6-difluoro-5-chloropyrimidine is added. A pH of 8-8.5 is maintained by simultaneous addition of 11% strength lithium hydroxide solution. T=30° C.-40° C. The mixture is cooled to 0° C. and 56 ml of 30% strength hydrochloric acid are added.

47 ml of sodium nitrite solution (30 g/100 ml) are added dropwise at 0°-5° C. in the course of 1 hour. The diazotization mixture is subsequently stirred at 0°-5° C. for 1 hour. Excess nitrite is then destroyed by addition of sulphamic acid.

b) 0.2 mol of 1-amino-8-hydroxynaphthalene-4,6-disulphonic acid is dissolved in 300 ml of water at pH=5-7 by addition of conc. sodium hydroxide solution. 300 g of ice are added and 0.21 mol of cyanuric chloride is sprinkled in. A pH of 4-4.5 is maintained at 0° C. using sodium carbonate solution (20 g/100 ml).

After condensation is complete, 0.2 mol of a neutral solution of 4-chloroaniline in about 200 ml of water is added. The mixture is heated to 20°-30° C. and a pH of 6-7 is maintained using sodium carbonate solution (20 g/100 ml). After about 1 hour, the mixture is cooled to 10° C. and the above diazotization mixture a) is added.

A pH of 7-7.5 is simultaneously maintained using sodium carbonate solution (20 g/100 ml).

After coupling is complete, the product is salted out using NaCl, isolated and dried. The dyestuff obtained, of the formula

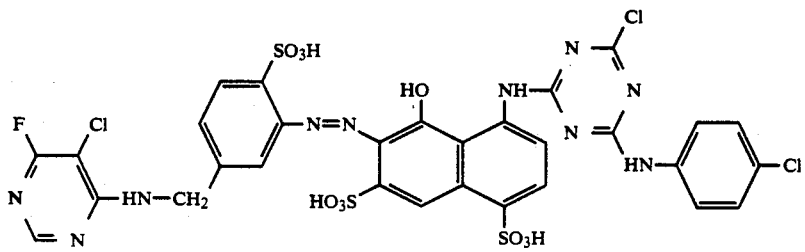

dyes cotton in red shades.

By variation of the diazo components, coupling components and amines, the dyestuffs of the following Examples 77-96 of the general formula

are obtained. They dye cotton in the shades indicated.

| | Diazo component | Coupling component | Z | Colour shade |
|---|---|---|---|---|
| 77 | 2-aminobenzene with SO₃H, NH₂, and X—NH substituents | naphthalene with NH—Z, SO₃H, OH, CH₃, HO₃S substituents | triazine with Cl, N-isopropyl, NH-phenyl-SO₂CH₂CH₂OSO₃H | Yellowish-tinged red $\lambda_{max}$ = 510 nm |
| 78 | benzene with SO₃H, NH₂, and X—N(CH₃)—CH₂ substituents | same naphthalene coupling component | triazine with Cl, N-isopropyl, NH-phenyl-SO₂CH₂CH₂OSO₃H | Yellowish-tinged red $\lambda_{max}$ = 510 nm |
| 79 | naphthalene with SO₃H, NH₂, and X—HN—CH₂ substituents | same naphthalene coupling component | triazine with Cl, N-isopropyl, NH-phenyl-SO₂CH₂CH₂OSO₃H | Red $\lambda_{max}$ = 518 nm Sh 536 nm |
| 80 | benzene with SO₃H, NH₂, X—NH substituents | same naphthalene coupling component | triazine with Cl, N-isopropyl, NH-(3-SO₃H-phenyl) | Yellowish-tinged red $\lambda_{max}$ = 510 nm, Sh 528 nm |

| | Diazo component | Coupling component | Z | Colour shade |
|---|---|---|---|---|
| 81 | 2-amino-1-SO₃H naphthalene with 5-CH₂-NH-X substituent (CH₂-NH-X at position 5) | 4-amino-5-hydroxy-naphthalene-2,7-disulfonic acid (NH-Z at 4, OH at 5, SO₃H at 2 and 7, with methyl) | 4-chloro-6-methyl-1,3,5-triazin-2-yl with NH-(3-sulfophenyl) | Red $\lambda_{max}$ = 516 nm, Sh 538 nm |
| 82 | 2-amino-1-SO₃H benzene with 4-CH₂-N(CH₃)-X | " | 4-chloro-6-methyl-1,3,5-triazin-2-yl with NH-(3-sulfophenyl) | Yellowish-tinged red $\lambda_{max}$ = 508 nm, Sh 526 nm |
| 83 | 2-amino-1-SO₃H benzene with 4-NH-X | 4-amino-5-hydroxy-naphthalene-2,7-disulfonic acid (with methyl) | 4-chloro-6-methyl-1,3,5-triazin-2-yl with NH-(4-SO₂CH₂CH₂OSO₃H-phenyl) | Red $\lambda_{max}$ = 515 nm, Sh 534 nm |
| 84 | 2-amino-1-SO₃H benzene with 4-CH₂-N(CH₃)-X | " | " | Red |

| | Diazo component | Coupling component | Z | Colour shade |
|---|---|---|---|---|
| 85 | 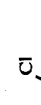 | " |  | Blueish-tinged red |
| 86 |  |  |  | Red |
| 87 |  |  | 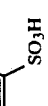 | Red $\lambda_{max}$ = 515 nm Sh 536 nm |
| 88 | 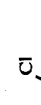 | " | (structure) | Red |

-continued

| | Diazo component | Coupling component | Z | Colour shade |
|---|---|---|---|---|
| 89 | 2-amino-1-sulfo-5-(X—HN—CH₂)-naphthalene | 8-amino-1-hydroxy-3,6-disulfo-7-methyl... (NH—Z at 8-position) | 4-chloro-6-methyl-1,3,5-triazin-2-yl-NH-(2,5-disulfophenyl) | Blueish-tinged red |
| 90 | 4-(X—NH)-2-amino-1-sulfobenzene | 8-(NH—CO—C₆H₄—NH—Z)-1-hydroxy-3,6-disulfonaphthalene | 4-chloro-6-methyl-1,3,5-triazin-2-yl-N(CH₃)(CH₂CH₂SO₃H) | Red |
| 91 | 2-amino-1-sulfo-5-(X—NH—CH₂)-naphthalene | ″ | 4-chloro-6-methyl-1,3,5-triazin-2-yl-morpholino | Red |
| 92 | 4-(X—NH)-2-amino-1-sulfobenzene | 6-(NH—Z)-1-hydroxy-3-sulfo-2-methylnaphthalene | 4-chloro-6-methyl-1,3,5-triazin-2-yl-NH-(3-(SO₂CH₂CH₂OSO₃H)phenyl) | Scarlet |

-continued

| | Diazo component | Coupling component | Z | Colour shade |
|---|---|---|---|---|
| 93 | SO₃H, NH₂, X—N(CH₃)—CH₂– (on benzene) | " | | Orange |
| 94 | SO₃H, NH₂, X—NH (on benzene) | " | chloro-methyl-triazinyl-NH-C₆H₄-SO₃H | Orange |
| 95 | SO₃H, NH₂, X—NH (on benzene) | 1-OH, 3-SO₃H, 2-CH₃, 6-N(CH₃)–Z naphthalene | chloro-methyl-triazinyl-N(Et)-C₆H₅ | Orange |
| 96 | SO₃H, NH₂, X—N(CH₃)—CH₂– (on benzene) | " | chloro-methyl-triazinyl-NH-C₆H₄-SO₂CH₂CH₂OSO₃H | Orange |

EXAMPLE 97

0.2 mol of 2-aminonaphthalenesulphonic acid is dissolved in 280 ml of water at pH 7 using lithium hydroxide and 250 g of ice are added. 0.21 mol of cyanuric fluoride is then added and the pH is maintained at about 4 using sodium carbonate solution. A neutral solution of 2,4-diaminobenzenesulphonic acid is added to the suspension thus formed and the pH is increased to 7-7.5. The reaction temperature is increased to 20° C. and the mixture is stirred for about 1 hour. The reaction mixture is cooled to 0° C. and diazotized at pH 2-2.2 using HCl and sodium nitrite solution. After destroying the excess of nitrite with sulphamic acid, the mixture is coupled at pH 7-8 and 10°-15° C. to the coupling component described in Example 32. Salting-out, isolating and drying gives the dyestuff of the formula

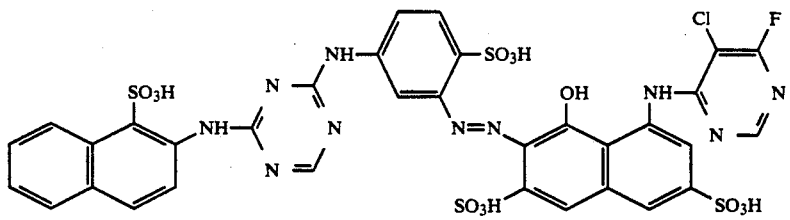

which dyes cotton in red shades.

The dyestuffs of Examples 98-110 of the general formula

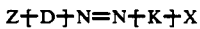

can be prepared in an analogous manner using the diazo and coupling components indicated.

However, in some cases it is more favourable to synthesize the azochromophore first and then to condense on the reactive components or one of them (Z). They dye cotton in the colour shades indicated.

X has the meaning indicated in formula (1).

| | Diazo component | Coupling component | Z | Colour shade |
|---|---|---|---|---|
| 98 | (2-amino-5-(Z-NH)-benzene-1-sulfonic acid with NH2, SO3H, Z—NH) | (naphthalene with NH—X, OH, SO3H, CH3, HO3S) | (triazine with F, N, N, morpholine) | Reddish-violet |
| 99 | (benzene with NH2, SO3H, Z—N(CH3)—CH2) | " | " | Bluish-tinged red |
| 101 | (naphthalene with NH2, SO3H, Z—HN—CH2) | (naphthalene with NH—X, OH, SO3H) | (triazine with F, N, N, NH-C6H4-SO3H) | Bluish-tinged red |
| 102 | (benzene with NH2, SO3H, SO3H, Z—HN) | " | (triazine with F, N, N, N(Et)(Ph)) | " |
| 103 | (benzene with NH2, SO3H, Z—NH) | (naphthalene with NH—CO—C6H4—NH—X, OH, SO3H, CH3, SO3H) | " | Red |

-continued
| | Diazo component | Coupling component | Z | Colour shade |
|---|---|---|---|---|
| 104 | 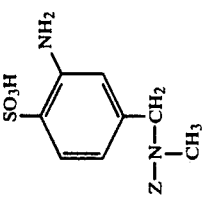 | " | 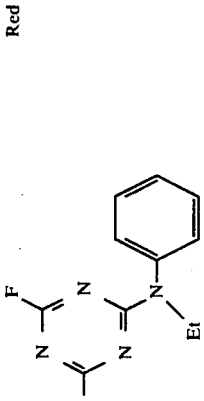 | Red |
| 105 | 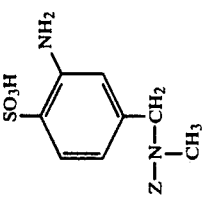 | 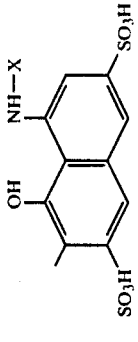 | 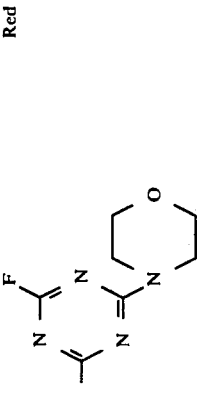 | Red |
| 106 | 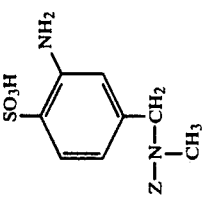 | 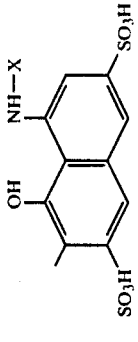 | 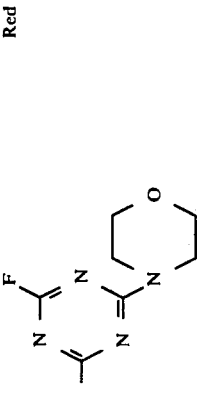 | Reddish-violet |
| 107 | 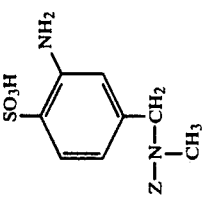 | " | 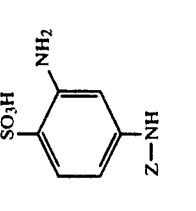 | Red |

EXAMPLE 111

0.22 mol of N-ethylaniline is dissolved in 200 ml of water at pH 7. 200 g of ice are added and 0.24 mol of cyanuric chloride is sprinkled in. A pH of 6-7 is maintained using sodium carbonate solution (20 g/100 ml). The condensation is complete after about 1 hour at 0° C. 0.2 mol of 2,4-diamino-benzenesulphonic acid is dissolved in 250 ml of water by addition of conc. sodium hydroxide solution and added to the condensation in one step. A pH of 6-7 is maintained using sodium carbonate solution (20 g/100 ml). The mixture is heated to 25°-35° C. After condensation is complete, it is cooled to 0° C. 56 ml of 30% strength hydrochloric acid are added. 47 ml of sodium nitrite solution (30 g/100 ml) are added dropwise and the mixture is stirred at 0° C. for 1 hour. Sodium nitrite is destroyed using sulphamic acid and the diazotization mixture thus obtained is added to the coupling component from Example 32. A pH of 7-8 is maintained using sodium carbonate solution (20 g/100 ml). T=10°-15° C. After coupling is complete, the product is salted out using NaCl, isolated and dried. The dyestuff obtained, of the formula

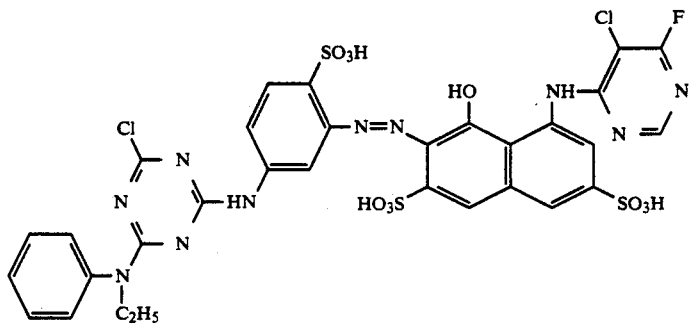

dyes cotton in red shades.

The dyestuffs of the examples 112-117 of the general formula

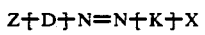

can be prepared analogously using the corresponding diazo components, coupling components and amines. In some cases it is more favourable to position the condensation with cyanuric chloride and amine at the conclusion of the synthesis frequency.

X has the meaning indicated in formula (1).

| | Diazo component | Coupling component | Z | Colour shade |
|---|---|---|---|---|
| 112 | 4-amino-2-(Z-NH)-benzene-1,5-disulfonic acid structure | 8-amino-1-hydroxy-naphthalene-3,6-disulfonic acid (with NH–X) | 4-chlorophenylamino-chloro-methyl-triazine | Reddish-violet |
| 113 | 5-amino-4-methoxy-2-(Z-NH-CH₂)-benzenesulfonic acid | ″ | N-methyl-N-phenylamino-chloro-methyl-triazine | Blueish-tinged red |
| 114 | 2-amino-5-(Z-N(CH₃)-CH₂)-naphthalene-1-sulfonic acid | ″ | 3-(SO₂CH₂CH₂OSO₃H)phenylamino-chloro-methyl-triazine | Blueish-tinged red |
| 115 | 2-amino-4-(Z-NH)-benzene-1-sulfonic acid | 8-(4-(NH–X)phenyl-NH–CO)-1-hydroxy-naphthalene-3,6-disulfonic acid | 3-(SO₂CH₂CH₂OSO₃H)phenylamino-chloro-methyl-triazine | Red |

-continued

| | Diazo component | Coupling component | Z | Colour shade |
|---|---|---|---|---|
| 116 | SO₃H, NH₂, Z—N—CH₂—CH₃ (benzene) | " | triazine (Cl, N, N) with NH–phenyl–SO₂CH₂CH₂OSO₃H | Red |
| 117 | SO₃H, NH₂, Z—N—CH₂—CH₃ (benzene) | naphthalene with OH, NH–X, SO₃H, CH₃ | triazine (Cl, N, N) with NH–phenyl–SO₂CH₂CH₂OSO₃H | Orange |

Other useful dyestuffs of the formula
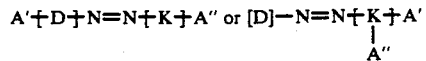
are those of Examples 118–134, which can be prepared by known methods, such, for example, as represented above, and dye cotton in the shades indicated.

| | A' | Diazo component | K | A'' | Colour shade |
|---|---|---|---|---|---|
| 118 | | | | | Golden-yellow |
| 119 | | | | | Golden-yellow |
| 120 | | | | | Reddish-tinged yellow |
| 121 | | | | | Reddish-tinged yellow |
| 122 | | | | | Blueish-tinged yellow |

-continued

| | A' | Diazo component | K | A'' | Colour shade |
|---|---|---|---|---|---|
| 123 | | | | | Orange |
| 131 | | | | | Violet |
| 132 | " | " | " | " | yellow |
| 133 | " | " | | " | Golden-yellow |
| 134 | | | | | Golden-yellow |

Tho dyestuffs of Examples 135–149 can be obtained analogously to the preparation processes described above or by customary methods using the corresponding starting components.
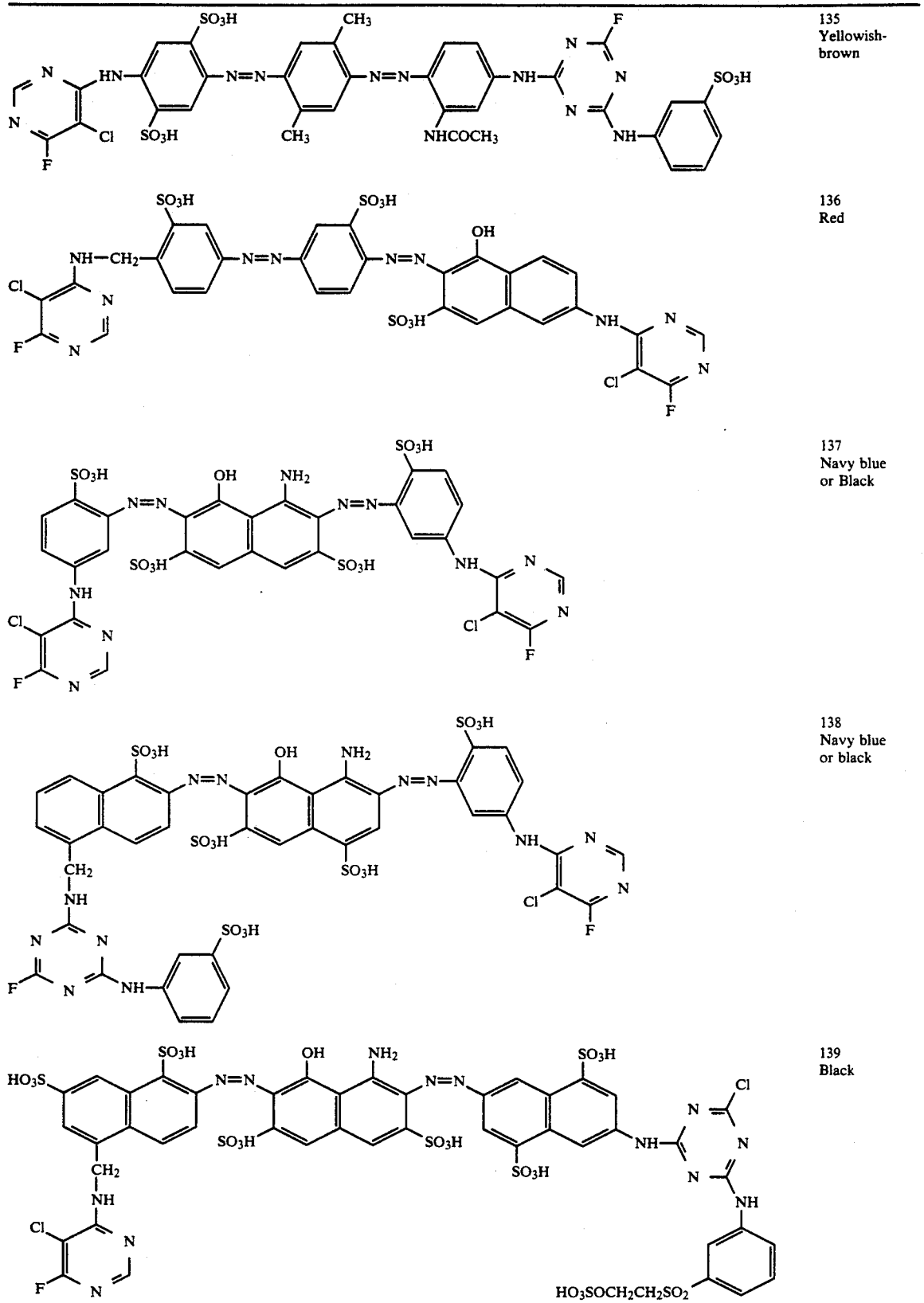

-continued
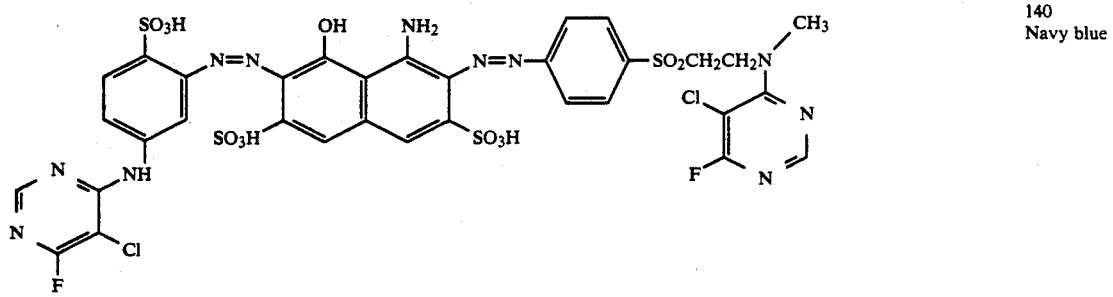
140
Navy blue
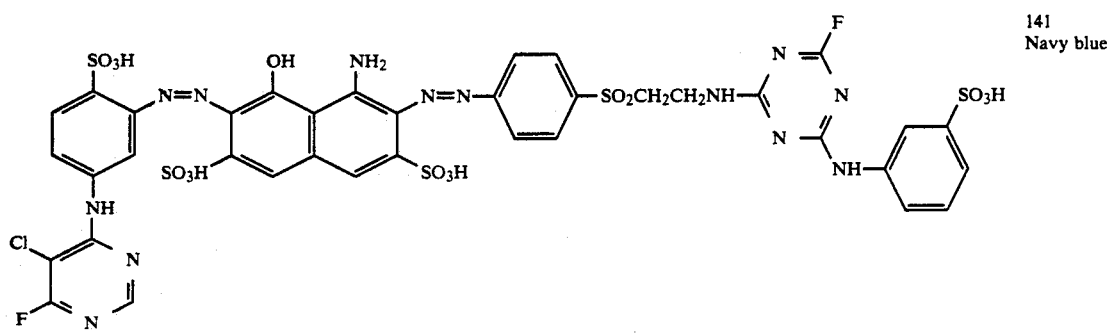
141
Navy blue
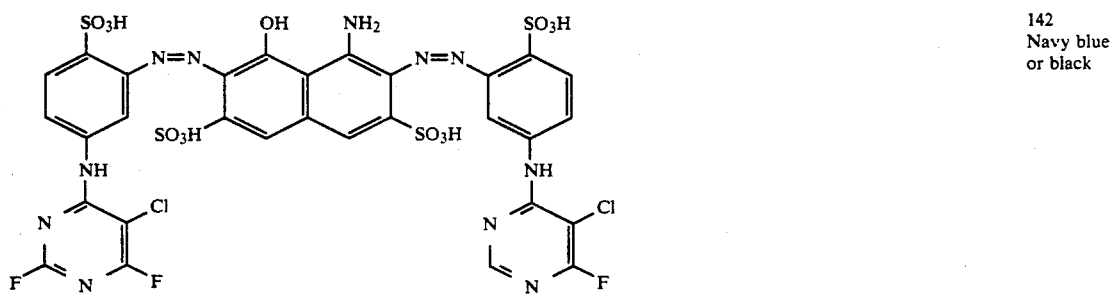
142
Navy blue
or black
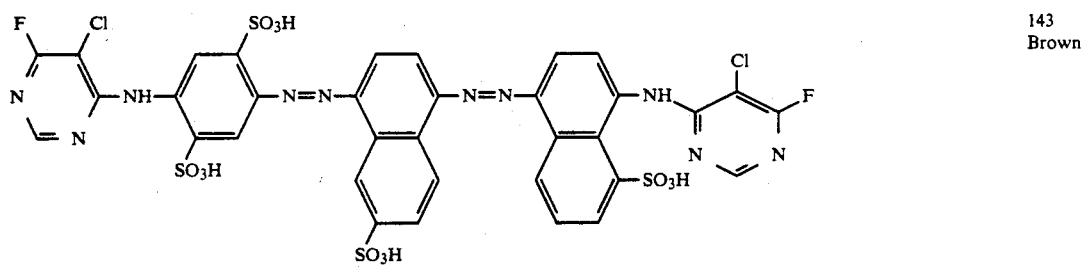
143
Brown
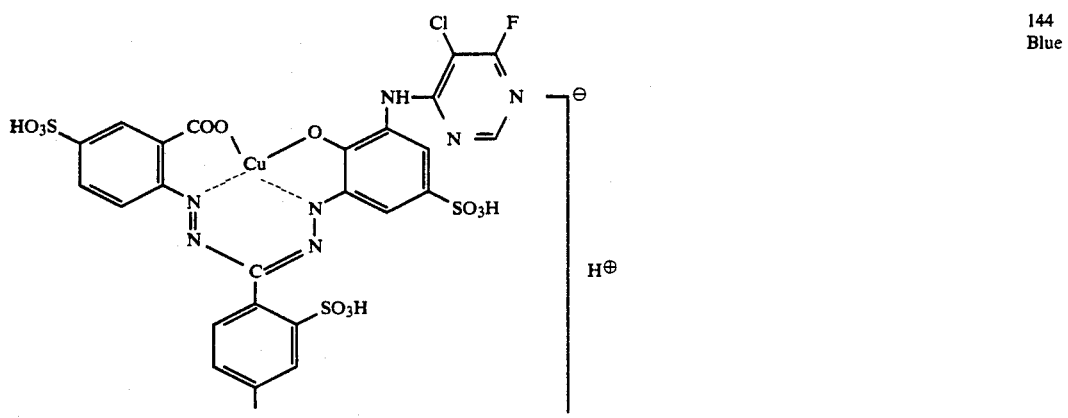
144
Blue

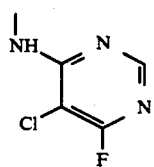
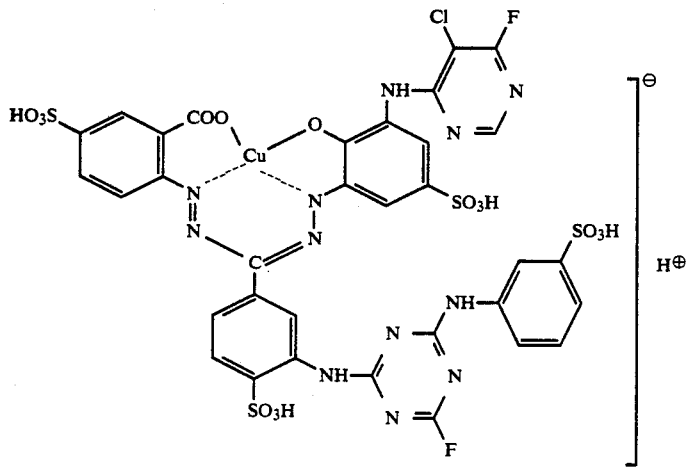
145
Blue
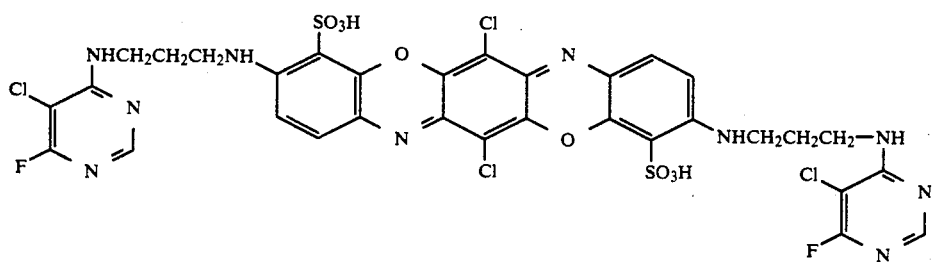
146
Blue
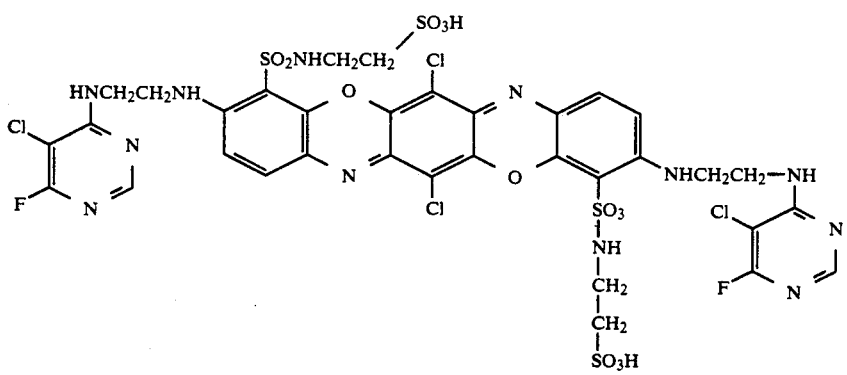
147
Blue
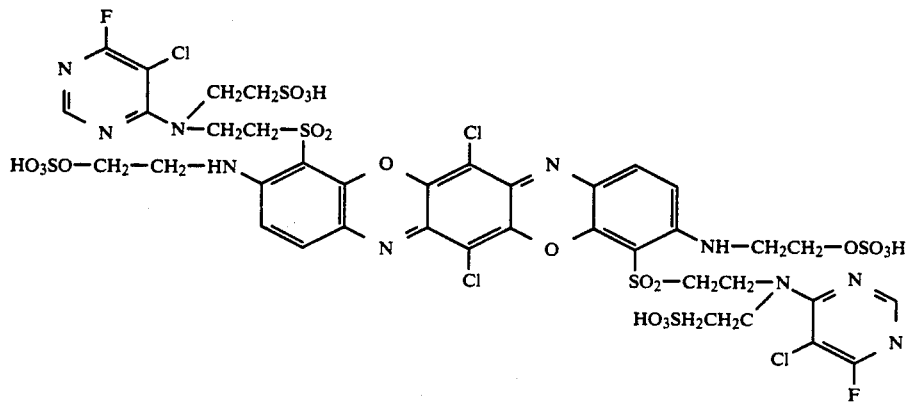
148
Blue -continued

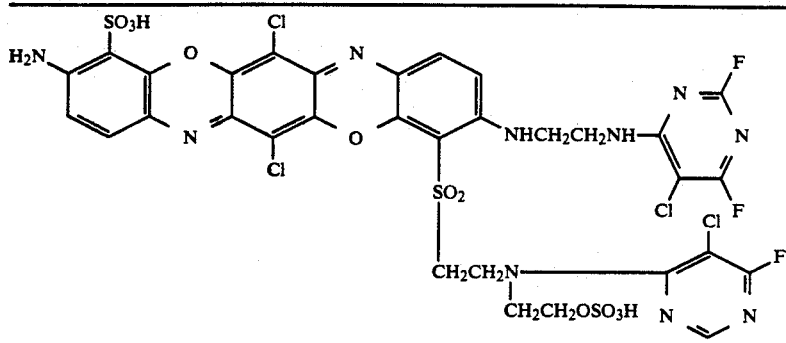

Blue

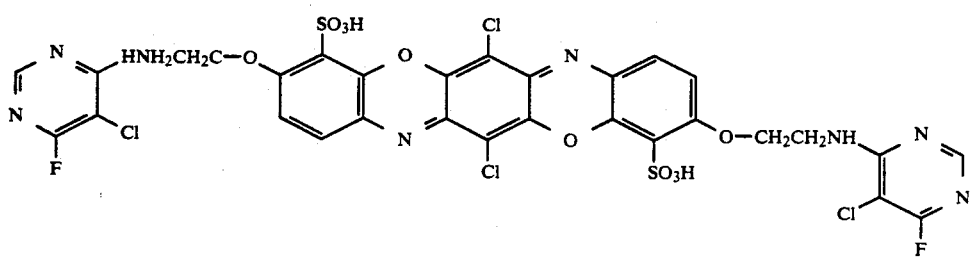

149
Red

We claim:
1. Reactive dyestuffs of the formula:

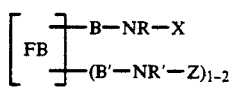  (I)

in which
FB represents the radical of a dyestuff selected from the group consisting of monoazo, polyazo and metal complex azo dyestuffs, which contain a carbocyclic aromatic or heterocyclic aromatic ring;

B and B' are bonded to a ring C atom of a carbocyclic aromatic ring of FB or to a ring C or N atom of a heterocyclic aromatic ring of FB and B and B' are independently a direct bond or a bridge member, the bridge member being selected from the group consisting of:

—N(R)-Alk-, —CON(R)-Alk-, —SO$_2$N(R)-Alk-, —O-Alk-,

—N(R)—CO-Alk-, —CON(R)—Ar—, —SO$_2$N(R)—Ar—,

—CO-Alk-, -Alk-, —SO$_2$-Alk-, -Alk-Ar—, or

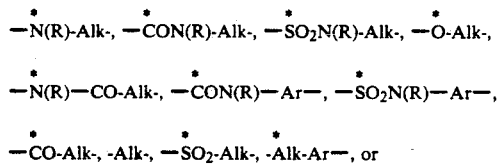

where
* represents the position where B or B' are bonded to FB;
Alk represents straight-chain or branched $C_{1-6}$-alkylene;
Ar represents optionally substituted phenylene, optionally substituted naphthylene, or a radical of a diphenyl or stilbene, substituents for Ar being selected from the group consisting of F, Cl, Br, $C_{1-4}$-alkyl, $C_{1-4}$-alkoxy, carboxyl or sulpho;

Q represents Alk or Ar or —Alk—Ar—, where Alk or Ar may be additionally substituted by F, Cl, Br, $C_{1-4}$-alkyl, $C_{1-4}$-alkoxy, carboxyl, or sulpho;
L represents F, Cl, Br, Amino, OH, $C_{1-4}$-alkoxy, phenoxy, or $C_{1-4}$-alkylthio;
X represents

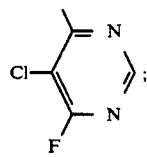

Z represents a pyrimidinyl, triazinyl or quinoxalinyl fiber-reactive radical;
R and R' independently represent H, $C_{1-6}$-alkyl, or $C_{1-6}$-alkyl substituted by halogen, carboxyl, hydroxyl, SO$_3$H, or OSO$_3$H substituted $C_{1-6}$-alkyl;
with the exception of the compound of the formula:

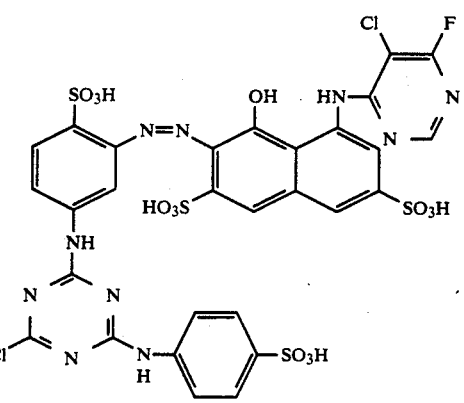

2. Dyestuffs of claim 1 of the formula:

$$X-\underset{R}{N}-B-[D]-N=N-[K]-B'-\underset{R'}{N}-Z \quad (1b)$$

$$Z-\underset{R'}{N}-B'-[D]-N=N-[K]-B-\underset{R}{N}-X \quad (1c)$$

$$X-\underset{R}{N}-B-D_1-N=N-[K]-N=N-D_2-B'-\underset{R'}{N}-Z \quad (1d)$$

or $$Z-\underset{R'}{N}-B'-D_1-N=N-[K]-N=N-D_2-B-\underset{R}{N}-X \quad (1e)$$

where
- D, $D_1$ and $D_2$ independently represent a radical of a benzene or naphthalene diazo component; and
- K represents a radical of a benzene, naphthalene, acetic acid arylide or heterocyclic coupling component.

3. Dyestuffs of claim 1, where Z=

[structure: triazine ring with Y substituent and N(R4)(R5) group]

in which $R_4$ and $R_5$ independently of one another are hydrogen, $C_{1-4}$-alkyl which is optionally substituted by halogen, cyano, $C_{1-4}$-alkoxy, hydroxyl, carboxyl, sulpho or sulphato, benzyl, phenethyl, cyclohexyl, phenyl or —NHCH$_2$CH$_2$OCH$_2$CH$_2$—SO$_2$M (M=—CH═CH$_2$ or —CH$_2$CH$_2$V where V=OSO$_3$H, SSO$_3$H, OCOCH$_3$, OPO$_3$H$_2$, OSO$_2$CH$_3$, SCN, NHSO$_2$CH$_3$, Cl, Br, F, OCOC$_6$H$_5$, OSO$_2$—C$_6$H$_4$, [N(CH$_3$)$_3$]$^+$ anion$^-$ or a pyridinium radical optionally substituted by C$_1$-C$_4$-alkyl, COOH, SO$_3$H, CN or carbonamide), phenyl which is optionally substituted by halogen, nitro, cyano, trifluoromethyl, sulphamoyl, carbamoyl, C$_{1-4}$-alkyl, C$_{1-4}$-alkoxy, C$_{1-4}$-alkanoylamino, benzoylamino, ureido, hydroxyl, carboxyl, sulphomethyl or sulpho, or naphthyl which is optionally substituted by halogen, nitro, C$_{1-4}$-alkyl, C$_{1-4}$-alkanoylamino, hydroxyl, carboxyl or sulpho, or in which $R_4$ and $R_5$, together with amino nitrogen atom, form a morpholino, piperidino or piperazino radical, and in which Y=Cl, F or a pyridinium radical optionally substituted by C$_{1-4}$-alkyl, COOH, SO$_3$H, CN, or carbonamide.

4. Dyestuffs of claim 1, in which $$-(B'-\underset{R'}{N}-Z) \text{ represents}$$

[structure (III): triazine linked via NR to phenyl bearing R2 and SO2M]

(III)

in which
Y=Cl or F,
M=CH═CH$_2$ or CH$_2$—CH$_2$—V, in which
  V=OSO$_3$H, SSO$_3$H, OCOCH$_3$, OPO$_3$H$_2$, OSO$_2$CH$_3$, SCN, NHSO$_2$CH$_3$, Cl, Br, F, OCOC$_6$H$_5$, OSO$_2$—C$_6$H$_4$, [N(CH$_3$)$_3$]$^+$ anion$^-$ or a pyridinium radical optionally substituted by C$_1$-C$_4$-alkyl, COOH, SO$_3$H, CN or carbonamide, and
$R_2$=H, Cl, Br, C$_{1-4}$-alkyl, C$_{1-4}$-alkoxy, CO$_2$H or SO$_3$H.

5. Dyestuffs of claim 1 of the formulae

[structure (2): A—HN—phenyl(SO$_3$H)$_{1-2}$—N═N—naphthalene(OH)(HO$_3$S)—N(R$_3$)—A]

(2)

[structure (3): bicyclic system with (SO$_3$H)$_{1-2}$, (CH$_2$)$_{0-1}$, NH—A, azo linkage to naphthalene with OH, SO$_3$H, NH—(CO—phenyl—NH)$_{0-1}$—A, SO$_3$H]

(3)

[structure (4): A—HN—phenyl(SO$_3$H)$_{0-1}$—N═N—naphthalene(HO)(NH$_2$)(HO$_3$S)(SO$_3$H)—N═N—phenyl(SO$_3$H)$_{0-1}$(HO$_3$S)—NH—A]

(4)

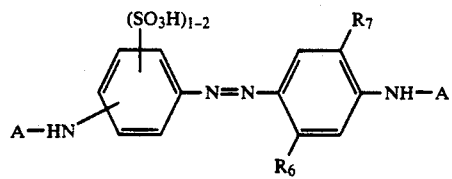 (5)
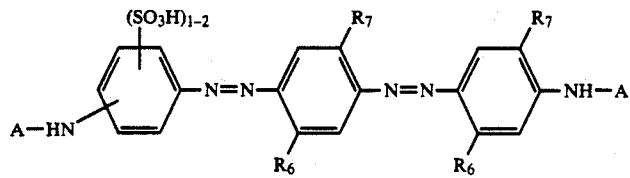 (6)
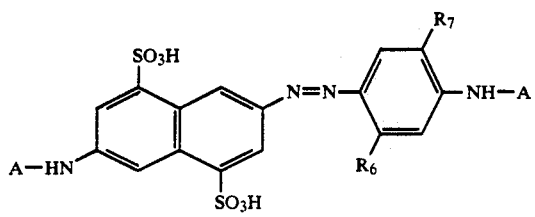 (7)
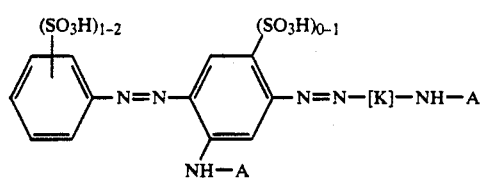 (8)
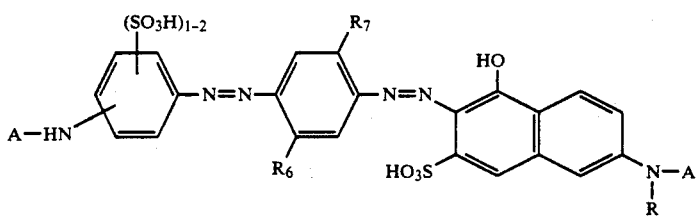 (9)
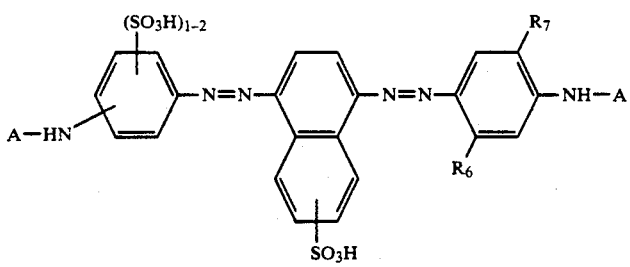 (10)
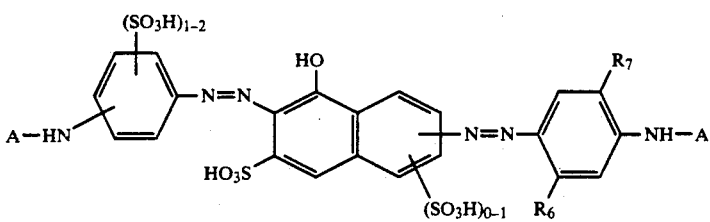 (11)
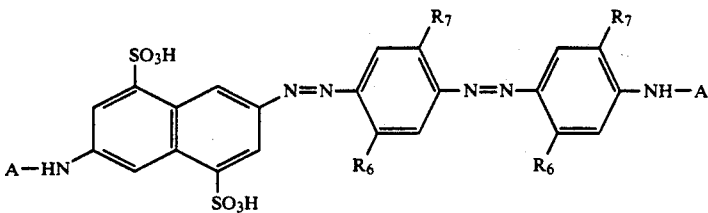 (12)

-continued
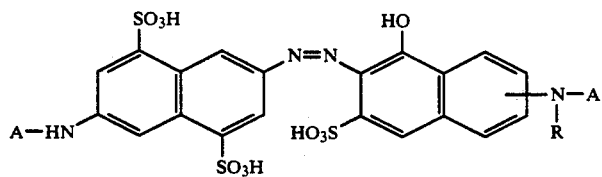
(13)
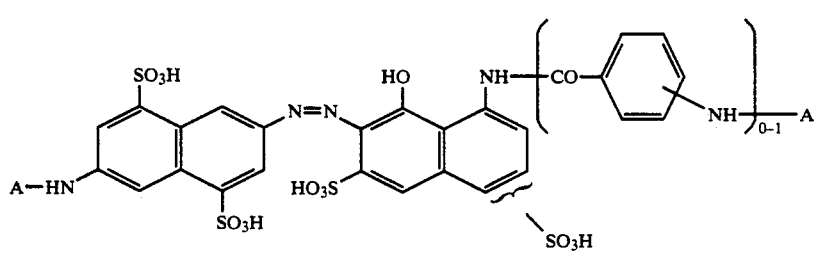
(14)
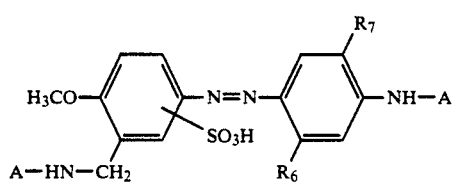
(15)
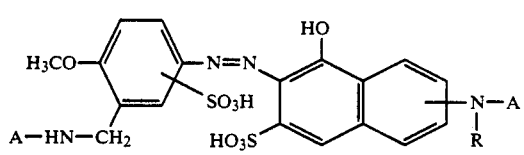
(16)
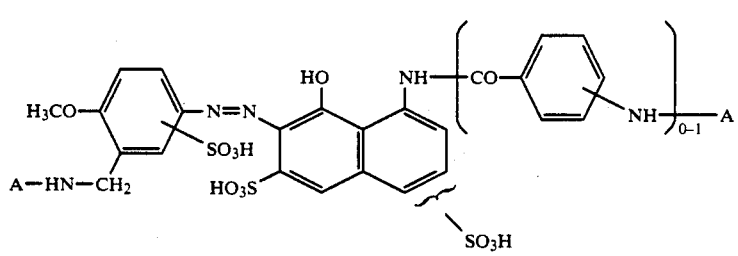
(17)
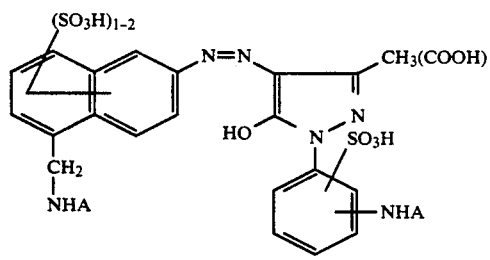
(18)
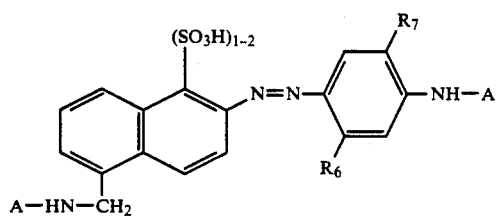
(19)

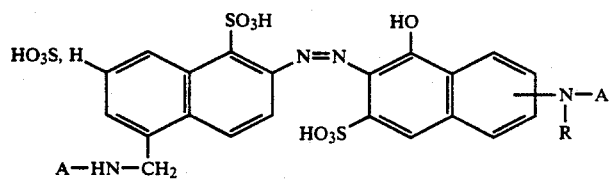
(20)
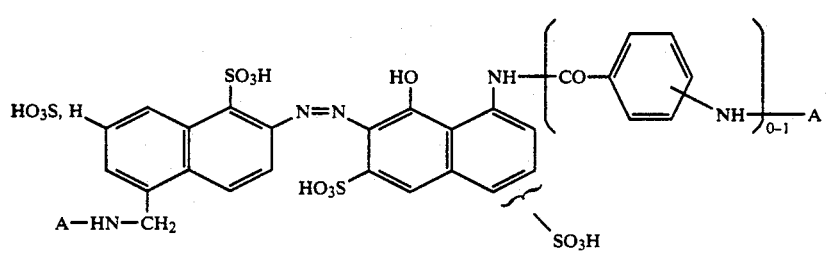
(21)
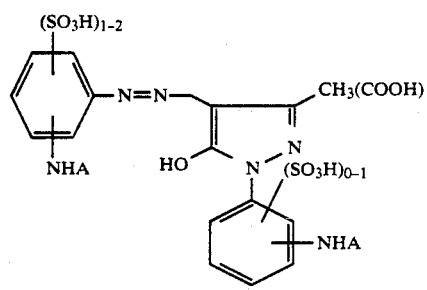
(22)
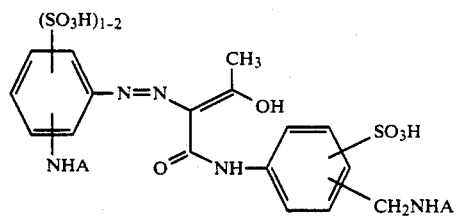
(23)
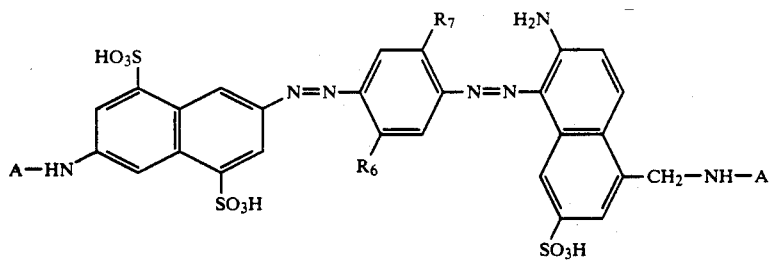
(24)
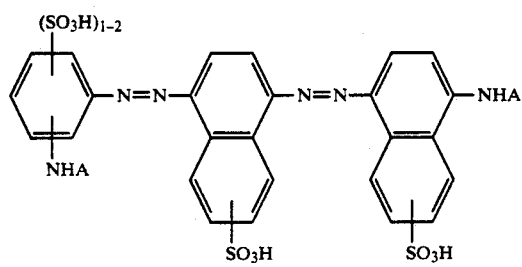
(25)

-continued
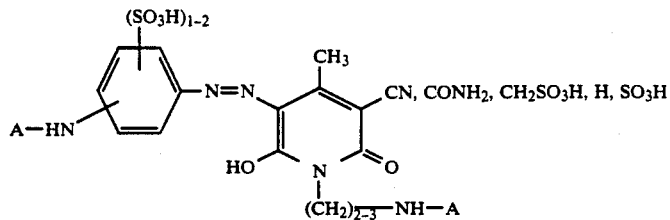 (26)
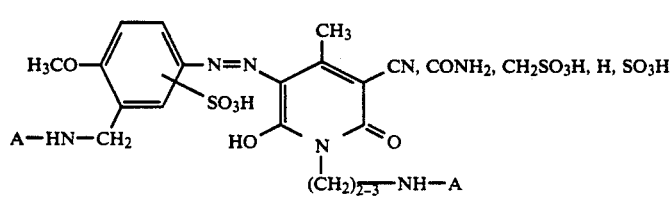 (27)
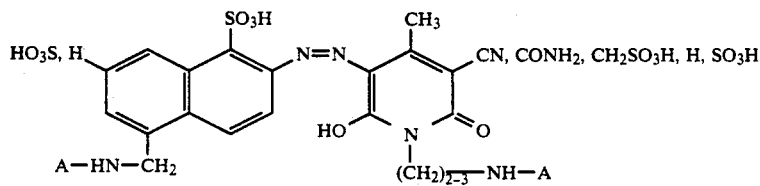 (28)
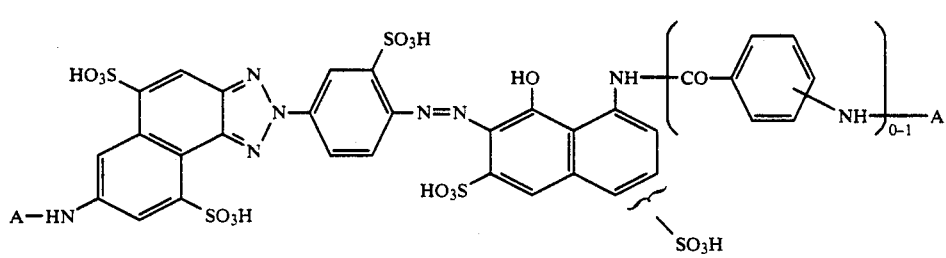 (29)
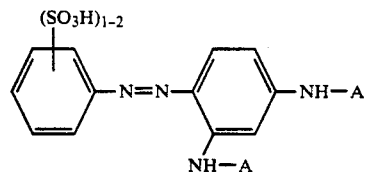 (30)
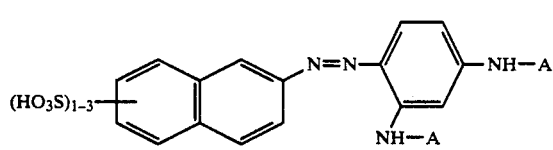 (31)
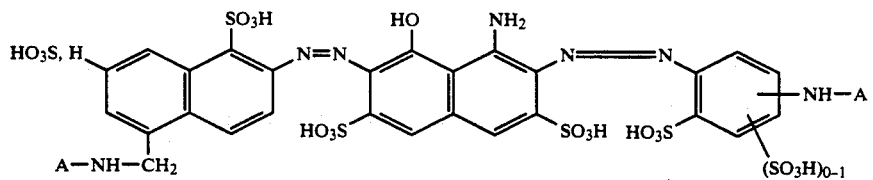 (32)
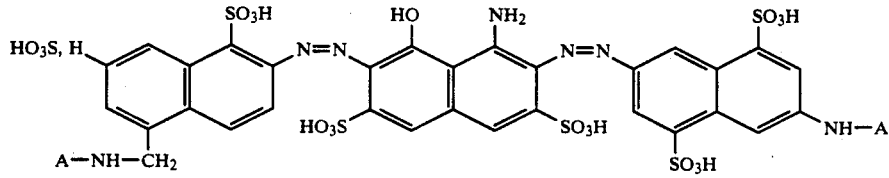 (33)

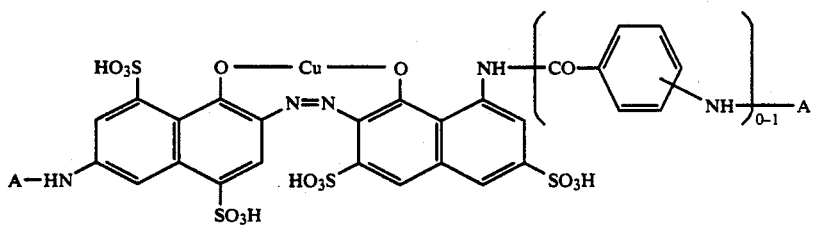

(34)

where
R$^3$=H, CH$_3$, or C$_2$H$_5$;
R$^6$=H, C$_{1-4}$-alkyl, C$_{1-4}$-alkoxy, C$_{1-4}$-alkylcarbonylamino, Cl or Br;
R$^7$=H, C$_{1-4}$-alkyl, C$_{1-4}$-alkoxy, OH, or SO$_3$H;
and in which either both A=X or one A represents X and the other A represents Z.

6. Dyestuffs of claim 1 where Z=a fibre-reactive fluorine-containing 4-pyrimidyl radical.

7. Dyestuffs of claim 3 in which R$_4$ and R$_5$ independently of one another are hydrogen, C$_{1-4}$-alkyl which is optionally substituted by halogen, cyano, C$_{1-4}$-alkoxy, hydroxyl, carboxyl, sulpho or sulphato, benzyl, phenethyl, cyclohexyl, phenyl or —NHCH$_2$CH$_2$OCH$_2$CH$_2$—SO$_2$M (M=—CH=CH$_2$ or —CH$_2$CH$_2$V), phenyl which is optionally substituted by halogen, nitro, cyano, trifluoromethyl, sulphamoyl, carbamoyl, C$_{1-4}$-alkyl, C$_{1-4}$-alkoxy, C$_{1-4}$-alkanoylamino, benzoylamino, ureido, hydroxyl, carboxyl, sulphomethyl, or naphthyl which is optionally substituted by halogen, nitro, C$_{1-4}$-alkoxy, C$_{1-4}$-alkanoylamino, hydroxyl, carboxyl or sulpho, or in which R$_4$ and R$_5$, together with the amino nitrogen atom, form a morpholino, piperidino or piperazino radical, and in which Y=Cl.

8. Dyestuffs of claim 3 in which R$_4$ and R$_5$ independently of one another are hydrogen, C$_{1-4}$-alkyl which is optionally substituted by halogen, cyano, C$_{1-4}$-alkoxy, hydroxyl, carboxyl, sulpho or sulphato, benzyl, phenethyl, cyclohexyl, phenyl or —NHCH$_2$CH$_2$OCH$_2$CH$_2$—SO$_2$M (M=—CH=CH$_2$ or —CH$_2$CH$_2$V), phenyl which is optionally substituted by halogen, nitro, cyano, trifluoromethyl, sulphamoyl, carbamoyl, C$_{1-4}$-alkyl, C$_{1-4}$-alkoxy, C$_{1-4}$-alkanoylamino, benzoylamino, ureido, hydroxyl, carboxyl, sulphomethyl or sulpho, or naphthyl which is optionally substituted by halogen, nitro, C$_{1-4}$-alkoxy, C$_{1-4}$-alkanoylamino, hydroxyl, carboxyl or sulpho, or in which R$_4$ and R$_5$, together with the amino nitrogen atom, form a morpholino, piperidino or piperazino radical, and in which Y=F.

9. Dyestuffs of claim 8 of the formula

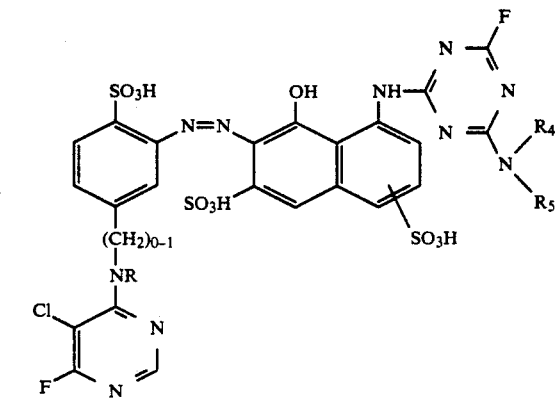

in which R$_4$ and R$_5$ independently of one another are hydrogen, C$_{1-4}$-alkyl which is optionally substituted by halogen, cyano, C$_{1-4}$-alkoxy, hydroxyl, carboxyl, sulpho or sulphato, benzyl, phenethyl, cyclohexyl, phenyl or —NHCH$_2$CH$_2$OCH$_2$CH$_2$—SO$_2$M (M=—CH=CH$_2$ or —CH$_2$CH$_2$V), phenyl which is optionally substituted by halogen, nitro, cyano, trifluoromethyl, sulphamoyl, carbamoyl, C$_{1-4}$-alkyl, C$_{1-4}$-alkoxy, alkoxy, C$_{1-4}$-alkanoylamino, benzoylamino, ureido, hydroxyl, carboxyl, sulphomethyl or sulpho, or naphthyl which is optionally substituted by halogen, nitro, C$_{1-4}$-alkoxy, C$_{1-4}$-alkanoylamino, hydroxyl, carboxyl or sulpho, or in which R$_4$ and R$_5$, together with the amino nitrogen atom, form a morpholino, piperidino or piperazino radical, and R represents H, CH$_3$ and C$_2$H$_5$.

10. Dyestuffs of claim 1 having the formula

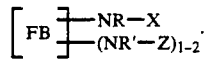

* * * * *